US012780699B2

(12) United States Patent
Buchan

(10) Patent No.: US 12,780,699 B2

(45) Date of Patent: Nov. 3, 2026

(54) FORMING OF DISINFECTANT SOLUTIONS

(71) Applicant: Control Chemicals (Pty) Ltd, Johannesburg (ZA)

(72) Inventor: Peter James Buchan, Johannesburg (ZA)

(73) Assignee: Control Chemicals (Pty) Ltd, Johannesburg (ZA)

( * ) Notice: Subject to any disclaimer, the term of this patent is extended or adjusted under 35 U.S.C. 154(b) by 1193 days.

(21) Appl. No.: 17/616,542

(22) PCT Filed: Jun. 5, 2020

(86) PCT No.: PCT/IB2020/055300

§ 371 (c)(1),
(2) Date: Dec. 3, 2021

(87) PCT Pub. No.: WO2020/245777

PCT Pub. Date: Dec. 10, 2020

(65) Prior Publication Data

US 2022/0234918 A1 Jul. 28, 2022

(30) Foreign Application Priority Data

Jun. 5, 2019 (ZA) ................................ 2019/03589
Jun. 5, 2019 (ZA) ................................ 2019/03590
Oct. 25, 2019 (ZA) ................................ 2019/07048

(51) Int. Cl.
*C02F 1/68* (2023.01)
*B01F 21/00* (2022.01)
(Continued)

(52) U.S. Cl.
CPC .............. *C02F 1/688* (2013.01); *C02F 1/001* (2013.01); *C02F 1/50* (2013.01); *C02F 2301/026* (2013.01); *C02F 2303/04* (2013.01)

(58) Field of Classification Search
CPC ...... C02F 1/688; C02F 2303/04; C02F 1/687; C02F 2301/026; C02F 2301/02;
(Continued)

(56) References Cited

U.S. PATENT DOCUMENTS 5,403,522 A 4/1995 Von Berg
5,419,355 A * 5/1995 Brennan ................ B01F 21/22 137/268

(Continued)

OTHER PUBLICATIONS

PCT International Search Report and Written Opinion issued in International Application No. PCT/IB2020/055300, mailed Aug. 5, 2020.

*Primary Examiner* — Pranav N Patel
(74) *Attorney, Agent, or Firm* — pH IP Law

(57) ABSTRACT

A method of dissolving a soluble disinfectant in solid format in a stream of water flowing in flow path, to provide an aqueous disinfectant solution in the flow path, includes directing a stream of water along the flow path toward a disinfectant dissolution zone in a disinfectant dispensing device located in the flow path. In the disinfectant dissolution zone, soluble disinfectant in solid format is located. Water of the stream of water contacts the disinfectant in the dissolution zone and thus dissolves of the disinfectant, thereby forming a disinfectant solution in the flow path in the dispensing device. Prior to water of the stream of water contacting the disinfectant, in a flow modification zone that is in the flow path in the dispensing device at an effective distance upstream of the disinfectant dissolution zone, at constant volumetric flow rate of the stream of water, one or more flow characteristics of water of the stream of water are artificially modified, for modified impact of water of the stream of water onto the disinfectant, by means of a flow modifying component that is located in the flow modification zone.

6 Claims, 11 Drawing Sheets

(51) Int. Cl.
*B01F 21/20* (2022.01)
*C02F 1/00* (2023.01)
*C02F 1/50* (2023.01)

(58) Field of Classification Search
CPC ........ C02F 1/001; C02F 1/50; B01F 21/4021; B01F 35/2209; B01F 35/718051; B01F 21/501; B01F 25/25; B01F 21/20; B01F 21/22; B01F 21/221; B01F 25/316; B01F 25/32
See application file for complete search history.

(56) References Cited

U.S. PATENT DOCUMENTS

| | | | | |
|---|---|---|---|---|
| 5,810,043 | A | 9/1998 | Grenier | |
| 6,464,885 | B1 | 10/2002 | Smith | |
| 7,065,803 | B2 * | 6/2006 | Mock, Sr. ............... | B01F 21/22 4/496 |
| 2017/0020062 | A1 | 1/2017 | Lovato | |
| 2018/0133666 | A1 * | 5/2018 | Blanchette .............. | B01F 25/25 |

* cited by examiner

FORMING OF DISINFECTANT SOLUTIONS

The present application is a national phase application under 35 U.S.C. § 371 of International Application No. PCT/IB2020/055300, filed Jun. 5, 2020, which claims the priority benefit of South African Application No. 2019/07048, filed Oct. 25, 2019, South African Application No. 2019/03589, filed Jun. 5, 2019, and South African Application No. 2019/03590, filed Jun. 5, 2019, the entire contents of each of which are hereby incorporated by reference.

FIELD OF THE INVENTION

THIS INVENTION relates to forming of disinfectant solutions. More particularly, the invention relates to forming of disinfectant solutions by dissolving a soluble disinfectant in solid format in a stream of water flowing in a flow path. The invention provides methods of dissolving a soluble disinfectant in solid format in a stream of water flowing in a flow path, to provide an aqueous disinfectant solution. The invention also provides devices for dissolving a soluble disinfectant in solid format in a stream of water flowing in a flow path, to provide an aqueous disinfectant solution. The invention extends to the devices in use. The invention also provides kits of disinfectant dispensing devices and flow modifying components.

BACKGROUND TO THE INVENTION

IN THE ART OF FORMING OF DISINFECTANT SOLUTIONS, it is known to dissolve a soluble disinfectant, specifically a chlorine-based disinfectant, from a solid, e.g. tablet, form thereof into a stream of water flowing in a flow path provided by a conduit, to provide an aqueous disinfectant solution for discharge from the conduit through a nozzle, e.g. a spray nozzle or a misting nozzle, provided at a downstream end of the conduit.

One approach in achieving this, devised by the applicant, involves restricting water contact with the tablet to an exposed axial end surface thereof, which surface is located in the path of the stream of water such that it faces the stream of water coaxially, for the water to impinge on the surface and thus cause dissolution of disinfectant from the tablet. In this manner, the tablet is eroded evenly, and a substantially even rate of dissolution is supposed to be achieved, since the size of the dissolution surface area remains substantially constant.

The applicant has encountered difficulty, however, in effectively exploiting the abovementioned approach in some cases. More specifically, the applicant has found that there tends to be significant variations in operating conditions between different end users and end use applications, which variations directly affect dispensing characteristics such as duration of use, consistency in concentration, efficacy, and storage between uses.

The following are examples of such variations:

- Differences in water temperature, either between end use locations or between climactic seasons (summer/winter) have a significant effect on the solubility of chlorine-based disinfectants. Thus, a dispensing method that works effectively in summer, may underperform in winter.
- Differences in ambient/local water pressure and flow volume result in significant differences in dissolution rate of chlorine-based disinfectants.
- Differences between end user preferences in water hose diameter—which impacts flow even when pressure is optimal—significantly affect dissolution characteristics and, therefore, dose rate.

In addition to these point-of-use challenges, the surface area to be sprayed/treated varies significantly between end-users, as does the disinfection requirements. This is problematic because innate characteristics of the chlorine-based compounds typically used in disinfectant tablets are that, unless a tablet is used to completion in every application, two further challenges are created for the end user:

- First, during storage between uses, chlorine tablets will continue to absorb ambient moisture left over after water flow stops. This not only liberates active ingredient to the atmosphere during storage, but typically results in the formation of a softened, spongy layer deep into the surface of disinfectant tablets. Once water-flow commences this spongy layer is instantly stripped away, resulting not only in an undesirably elevated chlorine spike, but also in a shortening of the lifespan of the tablet.
- Secondly, wet or moist chlorine compounds have a propensity to present a storage hazard due to a combination of noxious off-gassing, which is also a combustion-risk.

Further challenges arise in applications in which the water stream in which the disinfectant would be dissolved has a relatively low flow velocity at the interface with the tablet (i.e. at the exposed surface).

One case in which such relatively low flow velocity realises is in misting applications, i.e. when the nozzle at the downstream end of the conduit is a misting nozzle rather than a spray nozzle. In misting applications, the back pressure from the misting nozzle results in flow velocity of water in the region of the exposed surface being low compared to applications in in which the back pressure is smaller and thus negligible for purposes of disinfectant dissolution following the abovementioned approach.

A particular difficulty that the applicant has encountered is that, in misting applications in particular, it takes inordinately long for a tablet to be completely consumed when following the abovementioned approach, if complete consumption can be achieved at all within a reasonable time frame.

Complete and rapid consumption is desired for practical considerations. Partial consumption would, obviously, require residual disinfectant to be dealt with, or result in it being wasted. As for slow consumption, this results in uncertainty of and/or variation in disinfectant concentration in the aqueous disinfectant solution.

Further, misting and/or atomising equipment typically require water to exit centrifugally through very small apertures with a diameter as low as 0.5 mm. Since solid chlorine tablets release particulate matter when they dissolve, a risk exists that these particles would get stuck in misting-nozzle apertures, preventing water flow. All three of these are obviously undesired.

More generally, the applicant also found other challenges in controlling, and varying in a controlled manner, disinfectant concentration in some circumstances, in exploiting the abovementioned prior art approach of restricting water contact with an exposed axial end surface of a tablet. The applicant thus sought to provide an alternative to that approach that has more flexibility with respect to parameter control.

The above factors, at least, have presented challenges to a uniform, yet versatile, manner of effecting surface disinfection, using different solid soluble disinfectants in different operating conditions. The present invention seeks to address these challenges.

SUMMARY OF THE INVENTION

IN ACCORDANCE WITH A FIRST ASPECT OF THE INVENTION IS PROVIDED a method of dissolving a soluble disinfectant in solid format in a stream of water flowing in a flow path, to provide an aqueous disinfectant solution in the flow path, the method including

- directing a stream of water along a flow path toward a disinfectant dissolution zone in the flow path, in which disinfectant dissolution zone soluble disinfectant in solid format is located, such that water of the stream of water contacts the disinfectant in the dissolution zone and thus dissolves of the disinfectant, thereby forming a disinfectant solution in the flow path; and
- prior to water of the stream of water contacting the disinfectant, in a flow modification zone that is in the flow path at an effective distance upstream of the disinfectant dissolution zone, at constant volumetric flow rate of the stream of water, artificially modifying one or more flow characteristics of water of the stream of water, for modified impact of water of the stream of water onto the disinfectant, by means of a flow modifying component that is located in the flow modification zone.

In this specification, "effective distance" means that the flow modification zone is spaced from the dissolution zone sufficiently closely such that the modification of flow characteristics of water of the stream of water that is effected in the flow modification zone, is meaningfully translated into contact of the water with the disinfectant in the dissolution zone. Thus, the impact of water of the stream of water onto the disinfectant in the dissolution zone is different ("modified") downstream of the flow modification zone than it would have been upstream of the flow modification zone or in the absence of the flow modification component. Typically, the spacing would be small, i.e. a few millimetres or, at most, a few centimetres, e.g. up to 15 cm, up to 10 cm, up to 5 cm, up to 2 cm, or up to 1 cm.

Further, in this specification, "water of the stream of water" means the whole or a part of the stream of water.

At least in respect of the first and second aspects of the invention, "water of a stream of water" may therefore, in the context of flow modification, be understood to mean, for example, that the method may include, as described in more detail further below, one or more of

- simultaneously artificially increasing the velocity of some water of the stream of water that enters the flow modification zone and decreasing the velocity of other water of the stream of water that enters the flow modification zone,
- artificially increasing the velocity of all of the water of the stream of water that enters the flow modification zone,
- artificially decreasing the velocity of all of the water of the stream of water that enters the flow modification zone,
- artificially directing water of the stream of water that enters the flow modification zone, in the flow path, in a direction away from the disinfectant in the dissolution zone, e.g. directing water of the stream of water radially in the flow path, and
- artificially directing water of the stream of water that enters the flow modification zone, in the flow path, toward the disinfectant in the dissolution zone in a more focused manner than would have been the case upstream of the flow modification zone or in the absence of the flow modifying component, i.e. axially directing water of the stream of water, e.g. by narrowing the flow path for water of the stream of water.

It will be appreciated that flow modification is therefore effected in the flow modification zone by causing water of the stream of water physically to interact with, i.e. contact, the flow modifying component, with such interaction thus causing an increase in velocity, a decrease in velocity, and/or radial direction of water of the stream of water entering the flow modification zone.

The flow modification that is effected in the flow modification zone is therefore such that flow characteristics, including flow velocity and/or flow direction, of water of the stream of water are different downstream of the flow modification zone than upstream of the flow modification zone, being so modified by the physical interaction of water of the stream of water with the flow modifying component. Thus, impact of water of the stream of water onto the disinfectant is different downstream of the flow modification zone than it would have been upstream of the flow modification zone or in the absence of the flow modification zone, e.g. in respect of flow velocity in particular.

Flow of the stream of water in the flow path may be continuous, to effect continuous feeding of water into the flow modification and dissolution zones, thereby to effect continuous dissolution of disinfectant into the stream of water and continuous discharge of disinfectant solution from a conduit that provides the flow path.

The flow path may thus be provided by a conduit, and it will be appreciated that the disinfectant solution is therefore formed in the conduit for discharge from the conduit. Thus, the method may also include discharging disinfectant solution from the conduit.

At least a part of the conduit may be provided by a pipe.

In one embodiment of the invention, the pipe may provide the dissolution and flow modification zones.

In another embodiment of the invention, at least a part of the conduit may be provided by a hollow disinfectant dispensing device for dissolving a soluble disinfectant in solid format in a stream of water flowing in a flow path, to provide a disinfectant solution in the flow path.

Preferably, a part of the conduit is provided by a pipe and a part is provided by a hollow disinfectant dispensing device. The dispensing device may then be located in line with the pipe. Thus, the conduit, and therefore the flow path, may pass along the pipe and along the dispensing device. In this sense, "in line" means that the dispensing device and the pipe are arranged such that water of the stream of water flowing along the pipe is fed by the pipe into the dispensing device.

At least one, and preferably both, of the dissolution and flow modification zones may be provided by a hollow disinfectant dispensing device.

When the dissolution zone is provided by a hollow disinfectant dispensing device, it follows that the disinfectant solution would be formed in the dispensing device.

A part of the conduit providing the flow modification zone may be of greater diameter than a part of the conduit immediately upstream thereof. Therefore, in the case of the conduit being provided in part by a pipe and in part by a hollow disinfectant dispensing device, and the dispensing device providing the flow modification zone, the dispensing device may, in providing the flow modification zone, have a greater diameter than the pipe immediately upstream of the dispensing device.

The hollow disinfectant dispensing device may be a device of the second aspect of the invention and, therefore, the device of the second aspect of the invention may be a hollow disinfectant dispensing device.

Artificially modifying one or more flow characteristics of water of the stream of water, for modified impact of water of the stream of water onto the disinfectant, may include, for example, any one or a combination of

- artificially increasing the flow velocity of water of the stream of water,
- artificially decreasing the flow velocity of water of the stream of water,
- radially directing water of the stream of water (i.e. radially with respect to the axis of flow of water in the conduit, therefore away from a centre of the conduit), and
- axially directing water of the stream of water (i.e. axially with respect to the axis for flow of water flow in the conduit, therefore toward a centre of the conduit).

In accordance with the invention, and as mentioned earlier, such artificial modification would be effected by physical interaction of, i.e. contact between, water of the stream of water and the flow modifying component. Such modification would be relative to flow characteristics of water of the stream of water immediately upstream of the flow modification zone, i.e. prior to modification.

To modify the impact of water of the stream of water onto the disinfectant artificially by increasing the flow velocity of water of the stream of water, the flow modifying component may be configured to provide a narrowed flow path for water of the stream of water, relative to the flow path of the stream of water immediately upstream of the flow modifying component. Such modification may therefore also, in one embodiment and depending on the location of the narrowed flow path, amount to axial direction of water of the stream of water.

Thus, the flow modifying component may provide one or more flow path narrowing formations through which water of the stream of water may be passed at constant volumetric flow rate, thereby being accelerated.

Artificially increasing the flow velocity of water of the stream of water may therefore include passing water of the stream of water through a flow path narrowing formation provided by the flow modifying component in the flow modification zone.

At least one flow path narrowing formation may be axially located in the conduit, i.e. centrally in the conduit thereby axially to direct water of the stream of water, through the narrowed flow path defined by the flow path narrowing formation.

To modify the impact of water of the stream of water onto the disinfectant by artificially decreasing the flow velocity, or to direct water of the stream of water radially, the flow modifying component may be configured to decrease the flow velocity, or to direct water of the stream of water radially.

Typically, decreasing the flow velocity of water of the stream of water is achieved by directing water of the stream of water radially. In other words, in order to reduce the velocity of water of the stream of water, the flow component may radially disperse water of the stream of water, typically utilising the increased diameter of the flow modification zone to this effect.

Thus, the flow modifying component may provide a radial flow directing formation, typically one of a maximum diameter that approximates the diameter of the conduit at the flow modifying zone, thereby radially to direct, e.g. disperse, flow of water of the stream of water into a widened flow path relative to the width of the flow path immediately upstream of the flow modifying component. The radial flow directing formation may in one embodiment thereof therefore, functionally, be said to be a flow path widening formation and/or radial flow dispersing formation.

Artificially decreasing the velocity of water the stream of water may therefore include radially directing water of the stream of water by a radial flow directing formation of the flow modifying component, thus preventing direct impingement of water, so directed, onto the disinfectant in the disinfectant dissolution zone. With the flow modification zone and the flow modifying component being located in the flow path, such direction would be effected in the flow path.

As will be appreciated from the foregoing, when artificially modifying the flow velocity includes artificially decreasing the flow velocity and/or radially directing water of the stream of water, the flow modifying component may be configured such that it radially directs water of the stream of water in a direction radially away from a cross sectional centre of the conduit, and thus radially away from the disinfectant located in the dissolution zone. Thus, direct impingement of water, so directed, onto the disinfectant in the dissolution zone is avoided.

In this sense, the flow modifying component may partly or fully shelter the disinfectant from direct impingement of the full, unmodified stream of water flowing in the flow path, e.g. by providing a type of hood for the disinfectant, at an effective distance upstream of the dissolution zone.

In a preferred embodiment of the invention, the flow modifying component comprises a flared, substantially conical body. The conical body may be fully or partly hollowed out. Alternatively, the body may be filled.

The substantially conical body of the flow modifying component may be located coaxially in the flow path, with its apex thus being located centrally in the flow path, and being directed in an upstream direction. Thus, the flow modifying component would flare in a downstream direction. Water of the stream of water flowing along the flow path and into the flow modification zone would therefore be directed coaxially onto the apex of the substantially conical body of the flow modifying component.

Hereinafter, the term "flared part" is used to distinguish the rest of the substantially conical body of the flow modifying component from the apex thereof.

It will be appreciated that the flared part of the flow modifying component provides a downstream edge of the substantially conical body of the flow modifying component, which downstream edge also defines a maximum diameter of the substantially conical body.

The flared part of the flow modifying component may be the part of the flow modifying component that shelters the disinfectant from direct impingement of the full, unmodified stream of water flowing in the flow path.

Optionally, but preferably, the flow modifying component also includes a cylindrical part, coaxially mounted at the apex on an outside of the flared part. The cylindrical part may assist with mounting of the flow modifying component in the flow path in use.

The flow path narrowing formation, when provided, may extend coaxially through, and thus be provided by, the apex of the flow modifying component.

The flared part of the flow modifying component may be apertured, or it may be devoid of apertures.

Preferably, the flow modifying component is of a configuration selected from of one of the following embodiments:

- A first embodiment in which the flow path narrowing formation extends through the apex and the flared part is devoid of apertures. In this embodiment, flow of water of the stream of water would be modified by the flow path narrowing formation, which would increase the velocity of water passing through it. Flow of water of the stream of water may further be modified by the flared part, which would decrease the velocity of water radially directed by it. Such water may be allowed to pass over the downstream edge of the flared part into the dissolution one, or may be blocked by the flared part from passing into the dissolution zone, thus forcing all water entering the flow modification zone through the flow path narrowing formation, depending on how closely the maximum diameter of the flared part approximates the diameter of the flow modification zone in which it is located.
- A second embodiment in which the flow path narrowing formation extends through the apex and the flared part is apertured. In this embodiment, flow of water of the stream of water would be modified by the flow path narrowing formation, which would increase the velocity of water passing through it. Flow of water of the stream of water would further be modified by the flared part, which would decrease the velocity of water radially directed by it, but less so than the first embodiment due to the flared part being apertured, through which apertures radially directed water of the stream of water passes into the dissolution zone. The extent of velocity reduction of radially directed water of the stream of water may then depend on the number of apertures in the flared part.
- A third embodiment in which the flow path narrowing formation is omitted, and the flared part is apertured. In this embodiment, flow of water of the stream of water would not be modified by the flow path narrowing formation. Flow of water of the stream of water would only be modified by the flared part, which would decrease the velocity of water radially directed by it, again less so than the first embodiment due to the flared part being apertured, through which apertures radially directed water of the stream of water passes into the dissolution zone. The extent of velocity reduction of radially directed water of the stream of water may then, again, depend on the number of apertures in the flared part.
- A fourth embodiment in which the flow path narrowing formation is omitted, and the flared part is devoid of apertures. In this embodiment, flow of water of the stream of water would only be modified by the flared part, which would decrease the velocity of water radially directed by it. Such water would then be allowed to pass into the dissolution zone over a downstream edge of the flared part. Close approximation of the maximum diameter of the flared part and the diameter of the flow modification zone is undesired in this embodiment.
- A fifth embodiment in which the flow path narrowing formation extends through the apex and the flared part defines a plurality of additional flow path narrowing formations circumferentially arranged about the flow path narrowing formation. In this embodiment, in addition to the velocity of water passing through the flow narrowing formation being increased, velocity of water passing through he additional flow path narrowing formations is also increased, thus maximising the volume of water of increased flow velocity that is directed into the dissolution zone.

The disinfectant may be located cross-sectionally centrally in the flow path, and therefore also in the conduit that defines the flow path. The disinfectant would typically not, in the dissolution zone, fill, or extend across, the entire cross section of the flow path, and therefore of the conduit. In some embodiments it may, however, fill, or extend across, virtually the entire cross section of the flow path, in the dissolution zone.

The disinfectant may be a chlorine-based disinfectant. For example, the disinfectant may be selected from calcium hypochlorite and sodium dichloroisocyanurate (SDIC). It is believed that the invention would be more marginally applicable to trichloroisocyanuric acid (TCCA), but this disinfectant is not excluded from the scope of the invention. Thus, the disinfectant may be selected from calcium hypochlorite, sodium dichloroisocyanurate (SDIC) and trichloroisocyanuric acid (TCCA).

The disinfectant may be provided in solid format in the form of one or more tablets, i.e. in compressed or compacted particulate format.

The tablet/s may consist of the disinfectant, but more typically the tablet/s would comprise other chemical substances, also in particulate format, in addition to the disinfectant, e.g. effervescent agents and/or binding agents.

In one embodiment of the invention, one or more tablets provided in the dissolution zone may include, in addition to the disinfectant, an effervescent agent. A typical example of where an effervescent agent would be employed is in misting/atomising applications, where a misting/atomising nozzle is provided at a downstream end of the conduit and the method includes discharging disinfectant solution from the conduit as a mist, in which case back pressure from the nozzle is so significant that water flow in the dissolution zone is too low to disintegrate a tablet without the assistance of effervescence.

In one embodiment of the invention, a single tablet may be located in the dissolution zone.

The single tablet may, in one embodiment thereof, be located in the dissolution zone a holder, loosely, in the manner hereinafter described in respect of a plurality of tablets.

In another embodiment thereof, the single tablet may be located in the dissolution zone such that a surface thereof faces in a direction opposite to the direction of flow of the water stream in the conduit, i.e. in an upstream direction.

The surface of the tablet that faces in an upstream direction may be the only surface of the tablet that is accessible to water of the stream of water (hereinafter referred to as the "exposed surface"). In other words, remaining surfaces of the tablet may be isolated, i.e. closed off, from contact by water of the stream of water. Typically, the tablet may be held in a receptacle or may have a film-like covering layer that thus respectively isolates and exposes respective surfaces of the tablet.

It is noted that, since the disinfectant is soluble, contact of the water of the stream of water with the exposed surface of the tablet would generally axially erode the tablet at the exposed surface, such that the exposed surface thereby axially recedes and the tablet thereby being eroded evenly in, and from, a single direction.

In a single tablet embodiment of the invention as hereinbefore described, a solids filter may be provided downstream of the dissolution zone. Thus, the method may include filtering, downstream of the dissolution zone, solids from water of the stream of water. Such solids may include oversize undissolved disinfectant.

As an alternative to the single tablet-single surface embodiment, and more preferably, a plurality of tablets may be provided as a group of tablets in the dissolution zone.

The tablets of the group of tablets may be provided in an ordered, e.g. packed, or random, e.g. loose, manner.

The tablets of the group of tablets may be located in, and thus be grouped by, a hollow, apertured holder. In this sense, the term "holder" includes, any structure, e.g. a container, that defines an interior within which the tablet or tablets can be contained. Further, as noted above, the holder may, as an alternative embodiment, contain only one tablet.

It will be appreciated that being apertured, the holder, or container, would allow water of the stream of water to access and contact tablets of the grouped plurality of tablets, thereby to dissolve of the disinfectant from the tablets.

The tablets of the grouped plurality of tablets would typically be arranged loosely in a random manner. In other words, the tablets would typically not be packed in an ordered manner. Arranging the tablets in an ordered manner is not absolutely excluded from the scope of the invention, however.

When only one tablet is provided, the tablet may be located in the holder such that water contact with it is not restricted only to a part of its surface area. Therefore, when only one tablet is provided, the tablet may be located loosely inside the holder, such that water can access its entire surface area.

The holder may be in the form of a flexible packet, i.e. one that has flexible (deformable) rather than rigid walls. In such an embodiment, the packet may be of a synthetic, chlorine/oxidation-resistant plastics material, e.g. the packet may be of polypropylene, PET or HDPE. The flexible packet may have symmetrically spaced perforations across both its surfaces. The diameter of these apertures may vary depending on chemical or end-use application or preference, typically between 0.25 mm and 1.0 mm.

In addition to acting as both a storage receptacle for the tablet, or tablets and a built-in/internal "filter" able to prevent particulate matter from either blocking spray-nozzle apertures and/or resulting unwanted deposition of chemical on target-surfaces, during testing the applicant surprisingly discovered that the perforated packets served an important and unexpected technical function. Specifically, it is known that when a tablet is dissolved inside linear water flow the relative release—the "dose-rate"—will decline as the tablet dissolves. However, the applicant found that when a tablet is dissolved in a packet with very small perforations (<1.0 mm), a combination of water-flow deflection and the inability of particulate matter larger than 1.0 mm to escape the packet resulted in the formation of an aqueous chlorine concentrate inside the packet, and resulting in a more stable "buffered release" of chlorinated solution over the lifespan of the tablet, or tablets.

In another embodiment of the invention, the holder may be in the form of a rigid container, i.e. one that has rigid rather than flexible walls.

The method may include discharging aqueous disinfectant solution from the conduit through a discharge nozzle, for example as a spray or as a mist. The nozzle may, for example, be an atomising nozzle that atomises the water stream. In the case of medium flow, the atomising nozzle may be a micronizing nozzle, and in the case of low flow the atomising nozzle may be a misting nozzle.

The nozzle may be a nozzle that delivers a high flow rate, e.g. 500 to 750 litres per hour, or a medium flow rate, e.g. 100 to 500 litres per hour, or a low flow rate, e.g. 30 to 100 litres per hour. Thus, the method may include discharging aqueous disinfectant solution from the conduit at a flow rate in these ranges.

The method of this, first, aspect of the invention may comprise the features of the method of the third aspect of the invention.

IN ACCORDANCE WITH A SECOND ASPECT OF THE INVENTION IS PROVIDED a device for dissolving a soluble disinfectant in solid format in a stream of water flowing in a flow path to provide an aqueous disinfectant solution in the flow path, the device comprising

- a hollow body defining at least a part of a flow path along which a stream of water can be directed;
- a disinfectant dissolution zone in the flow path in the body, in which a soluble disinfectant in solid format is in use located; and
- a flow modification zone in the flow path in the body, at an effective distance upstream of the disinfectant dissolution zone, in which flow modification zone a flow modifying component is located, wherein the flow modifying component is configured artificially to modify one or more flow characteristics of water of the stream of water by interaction of water of the stream of water with the flow modifying component, for modified impact of water of the stream of water onto the disinfectant, at constant volumetric flow rate.

It will be appreciated that by dissolving soluble disinfectant in solid format in a stream of water flowing in a flow path, the disinfectant is thus dispensed into the stream of water. Thus, the device, and other devices for such purposes as described herein, may be referred to as a "dispensing device" as is from time to time the case throughout this specification.

The device may be a device for performing the method of the first aspect of the invention. The device may therefore be a hollow disinfectant dispensing device as described with reference to the method of the first aspect of the invention.

The device may provide a conduit that defines the flow path, or at least a part of the flow path.

The disinfectant may, in use, be located cross-sectionally centrally in the flow path, and therefore also in the conduit that defines the flow path. The disinfectant would typically not, in the dissolution zone, fill, or extend across, the entire cross section of the flow path, and therefore of the conduit. In some embodiments it may, however, fill, or extend across, virtually the entire cross section of the flow path, in the dissolution zone.

The flow modifying component may provide any one or more of

- a flow path narrowing formation, artificially to increase the flow velocity of water of the stream of water passed through the formation and/or axially to direct water of the stream of water,
- a radial flow directing formation, radially to direct water of the stream of water relative to a cross-sectional centre of the flow path, and therefore also of a conduit defining the flow path, and thus artificially to decrease the flow velocity of water so directed, thus preventing direct impingement of water, so directed, onto the disinfectant in the disinfectant dissolution zone.

In a preferred embodiment of the invention, the flow modifying component comprises a flared, substantially conical body. The conical body may be fully or partly hollowed out. Alternatively, the body may be filled.

The substantially conical body of the flow modifying component may be located coaxially in the flow path, with its apex directed in an upstream direction and located cross-sectionally centrally in the flow path, and therefore also in the conduit defining the flow path. Thus, the substantially conical body of the flow modifying component flares in a downstream direction, and water flowing along the flow path into the flow modification zone would be directed coaxially onto the apex of the substantially conical body of the flow modifying component.

Hereinafter, the term "flared part" is used to distinguish the rest of the substantially conical body of the flow modifying component from the apex thereof.

It will be appreciated that the flared part provides a downstream edge of the substantially conical body of the flow modifying component, which downstream edge also defines a maximum diameter of the substantially conical body.

The flared part may shelter the disinfectant from direct impingement of the full, unmodified stream of water flowing in the flow path.

Optionally, but preferably, the flow modifying component also includes a cylindrical part, coaxially mounted at the apex on an outside of the flared part. The cylindrical part may assist with mounting of the flow modifying component in the flow path in use.

The flow path narrowing formation, when provided, may extend coaxially through, and thus be provided by, the apex.

The flared part of the flow modifying component may be apertured, or it may be devoid of apertures.

Preferably, the flow modifying component is of a configuration selected from of one of the following embodiments:

- A first embodiment in which the flow path narrowing formation extends through the apex and the flared part is devoid of apertures. In this embodiment, flow of water of the stream of water would be modified by the flow path narrowing formation, which would increase the velocity of water passing through it. Flow of water of the stream of water may further be modified by the flared part, which would decrease the velocity of water radially directed by it. Such water may be allowed to pass over the downstream edge of the flared part into the dissolution one, or may be blocked by the flared part from passing into the dissolution zone, thus forcing all water entering the flow modification zone through the flow path narrowing formation, depending on how closely the maximum diameter of the flared part approximates the diameter of the flow modification zone in which it is located.
- A second embodiment in which the flow path narrowing formation extends through the apex and the flared part is apertured. In this embodiment, flow of water of the stream of water would be modified by the flow path narrowing formation, which would increase the velocity of water passing through it. Flow of water of the stream of water would further be modified by the flared part, which would decrease the velocity of water radially directed by it, but less so than the first embodiment due to the flared part being apertured, through which apertures radially directed water of the stream of water passes into the dissolution zone. The extent of velocity reduction of radially directed water of the stream of water may then depend on the number of apertures in the flared part.
- A third embodiment in which the flow path narrowing formation is omitted, and the flared part is apertured. In this embodiment, flow of water of the stream of water would not be modified by the flow path narrowing formation. Flow of water of the stream of water would only be modified by the flared part, which would decrease the velocity of water radially directed by it, again less so than the first embodiment due to the flared part being apertured, through which apertures radially directed water of the stream of water passes into the dissolution zone. The extent of velocity reduction of radially directed water of the stream of water may then, again, depend on the number of apertures in the flared part.
- A fourth embodiment in which the flow path narrowing formation is omitted, and the flared part is devoid of apertures. In this embodiment, flow of water of the stream of water would only be modified by the flared part, which would decrease the velocity of water radially directed by it. Such water would then be allowed to pass into the dissolution zone over a downstream edge of the flared part. Close approximation of the maximum diameter of the flared part and the diameter of the flow modification zone is undesired in this embodiment.
- A fifth embodiment in which the flow path narrowing formation extends through the apex and the flared part defines a plurality of additional flow path narrowing formations circumferentially arranged about the flow path narrowing formation. In this embodiment, in addition to the velocity of water passing through the flow narrowing formation being increased, velocity of water passing through he additional flow path narrowing formations is also increased, thus maximising the volume of water of increased flow velocity that is directed into the dissolution zone.

The flow modifying component may be a removable part of the dispensing device.

The disinfectant may be a chlorine-based disinfectant. For example, the disinfectant may be selected from calcium hypochlorite and sodium dichloroisocyanurate (SDIC). It is believed that the invention would be more marginally applicable to trichloroisocyanuric acid (TCCA), but this disinfectant is not excluded from the scope of the invention. Thus, the disinfectant may be selected from calcium hypochlorite, sodium dichloroisocyanurate (SDIC) and trichloroisocyanuric acid (TCCA).

The disinfectant may be provided in solid format in the form of one or more tablets, i.e. in compressed or compacted particulate format.

The tablet/s may consist of the disinfectant, but more typically the tablet/s would comprise other chemical substances, also in particulate format, in addition to the disinfectant, e.g. effervescent agents and/or binding agents.

In one embodiment of the invention, one or more tablets provided in the dissolution zone may include, in addition to the disinfectant, an effervescent agent. A typical example of where an effervescent agent would be employed is in misting/atomising applications, where a misting/atomising nozzle is provided at a downstream end of the conduit, in which case back pressure from the nozzle in use is so significant that water flow in the dissolution zone is too low to disintegrate a tablet without the assistance of effervescence.

In one embodiment of the invention, a single tablet may be located in the dissolution zone.

The single tablet may, in one embodiment thereof, be located in the dissolution zone a holder, loosely, in the manner hereinafter described in respect of a plurality of tablets.

In another embodiment thereof, the single tablet may be located in the dissolution zone such that a surface thereof faces in a direction opposite to the direction of flow of the water stream in the conduit, i.e. in an upstream direction.

The surface of the tablet that faces in an upstream direction may be the only surface of the tablet that is accessible to water of the stream of water (hereinafter referred to as the "exposed surface"). In other words, remaining surfaces of the tablet may be isolated, i.e. closed off, from contact by water of the stream of water. Typically, the tablet may be held in a receptacle or may have a film-like covering layer that thus respectively isolates and exposes respective surfaces of the tablet.

It is noted that, since the disinfectant is soluble, contact of the water of the stream of water with the exposed surface of the tablet would generally axially erode the tablet at the exposed surface, such that the exposed surface thereby axially recedes and the tablet thereby being eroded evenly in, and from, a single direction.

In a single tablet embodiment of the invention as hereinbefore described, a solids filter may be provided downstream of the dissolution zone for filtering, downstream of the dissolution zone, solids from water of the stream of water. Such solids may include oversize undissolved disinfectant.

As an alternative to the single tablet-single surface embodiment, and more preferably, a plurality of tablets may be provided as a group of tablets in the dissolution zone.

The tablets of the group of tablets may be provided in an ordered, e.g. packed, or random, e.g. loose, manner.

The tablets of the group of tablets may be located in, and thus be grouped by, a hollow, apertured holder. In this sense, the term "holder" includes, any structure, e.g. a container, that defines an interior within which the tablet or tablets can be contained. Further, as noted above, the holder may, as an alternative embodiment, contain only one tablet.

It will be appreciated that being apertured, the holder, or container, would allow water of the stream of water to access and contact tablets of the grouped plurality of tablets, thereby to dissolve of the disinfectant from the tablets.

The tablets of the grouped plurality of tablets would typically be arranged loosely in a random manner. In other words, the tablets would typically not be packed in an ordered manner. Arranging the tablets in an ordered manner is not absolutely excluded from the scope of the invention, however.

When only one tablet is provided, the tablet may be located in the holder such that water contact with it is not restricted only to a part of its surface area. Therefore, when only one tablet is provided, the tablet may be located loosely inside the holder, such that water can access its entire surface area.

The holder may be in the form of a flexible packet, i.e. one that has flexible (deformable) rather than rigid walls. In such an embodiment, the packet may be of a synthetic, chlorine/oxidation-resistant plastics material, e.g. the packet may be of polypropylene, PET or HDPE. The flexible packet may have symmetrically spaced perforations across both its surfaces. The diameter of these apertures may vary depending on chemical or end-use application or preference, typically between 0.25 mm and 1.0 mm.

In addition to acting as both a storage receptacle for the tablet, or tablets and a built-in/internal "filter" able to prevent particulate matter from either blocking spray-nozzle apertures and/or resulting unwanted deposition of chemical on target-surfaces, during testing the applicant surprisingly discovered that the perforated packets served an important and unexpected technical function. Specifically, it is known that when a tablet is dissolved inside linear water flow the relative release—the "dose-rate"—will decline as the tablet dissolves. However, the applicant found that when a tablet is dissolved in a packet with very small perforations (<1.0 mm), a combination of water-flow deflection and the inability of particulate matter larger than 1.0 mm to escape the packet resulted in the formation of an aqueous chlorine concentrate inside the packet, and resulting in a more stable "buffered release" of chlorinated solution over the lifespan of the tablet, or tablets.

In another embodiment of the invention, the holder may be in the form of a rigid container, i.e. one that has rigid rather than flexible walls.

The conduit may have a discharge nozzle defining a point of discharge. Thus, the tablet or grouped plurality of tablets would be located upstream of the discharge nozzle as well.

The nozzle may be a nozzle that in use delivers a high flow rate, e.g. 500 to 750 litres per hour, or a medium flow rate, e.g. 100 to 500 litres per hour, or a low flow rate, e.g. 30 to 100 litres per hour. The nozzle may, for example, be an atomising nozzle that atomises the water stream. In the case of medium flow, the atomising nozzle may be a micronizing nozzle, and in the case of low flow the atomising nozzle may be a misting nozzle.

The device of this, second, aspect of the invention may comprise the features of the device of the fourth aspect of the invention.

THE INVENTION EXTENDS TO the device according to the second aspect of the invention in use, in which a stream of water is directed along the flow path in accordance with the method of the first aspect invention.

IN ACCORDANCE WITH A THIRD ASPECT OF THE INVENTION IS PROVIDED a method of dissolving a soluble disinfectant in solid form in a stream of water flowing in a flow path, to provide an aqueous disinfectant solution in the flow path, the method including locating
- a grouped plurality of tablets; or
- a single tablet comprising a soluble disinfectant in solid form, contained inside a hollow apertured holder, in a disinfectant dissolution zone in the flow path; and directing the stream of water onto grouped plurality of tablets such that water from the stream impinges onto the grouped plurality of tablets, thereby contacting at least some of the tablets and dissolving disinfectant therefrom, to provide the aqueous disinfectant solution inside the holder.

The term "holder" as used above in respect of the third aspect of the invention includes any structure, e.g. a container, that defines an interior within which the tablet or tablets can be contained.

It will be appreciated that, being apertured, the holder, or container, would allow water of the stream of water to access and contact the tablet, or tablets of the grouped plurality of tablets.

It will further be appreciated that the grouped plurality of tablets, being contained inside the holder, would be grouped by the holder (or "container").

Flow of water in the flow path may be continuous.

The flow path may be provided by a conduit. It will be appreciated that the disinfectant solution is formed for discharge from the conduit.

At least a part of the conduit may be provided by a pipe. In one embodiment of the invention, the pipe may provide the dissolution zone.

Alternatively, or more preferably additionally, at least a part of the conduit may be provided by a hollow disinfectant dispensing device. The dispensing device may then provide the dissolution zone.

The tablet or tablets may comprise the disinfectant in a granular format, having been compacted to form the tablet.

The disinfectant may, in particular, be a chlorine-based disinfectant. For example, the disinfectant may be selected from calcium hypochlorite and sodium dichloroisocyanurate (SDIC). It is believed that the invention would be more marginally applicable to trichloroisocyanuric acid (TCCA), but this disinfectant is not excluded from the scope of the invention. Thus, the disinfectant may be selected from calcium hypochlorite, sodium dichloroisocyanurate (SDIC) and trichloroisocyanuric acid (TCCA).

In one embodiment of the invention, one or more tablets provided in the dissolution zone may include, in addition to the disinfectant, an effervescent agent. A typical example of where an effervescent agent would be employed is in misting/atomising applications, where a misting/atomising nozzle is provided at a downstream end of the conduit, in which case back pressure from the nozzle in use is so significant that water flow in the dissolution zone is too low to disintegrate a tablet without the assistance of effervescence.

The tablets of the grouped plurality of tablets would typically be arranged loosely in a random manner. In other words, the tablets would typically not be packed in an ordered manner. Arranging the tablets in an ordered manner is not absolutely excluded from the scope of the invention, however.

The tablet, when only one tablet is provided, may be contained by the holder and may be located such that water contact with it is not restricted only to a part of its surface area. Therefore, the tablet, when only one tablet is provided, may in one embodiment be located loosely inside the holder, such that water can access its entire surface area.

In a one embodiment of the invention, the holder may be in the form of a flexible packet, i.e. one that has flexible (deformable) rather than rigid walls. In such an embodiment, the packet may be of a synthetic, chlorine/oxidation-resistant plastics material, e.g. the packet may be of polypropylene, PET or HDPE. The flexible packet may have symmetrically spaced perforations across both its surfaces. The diameter of these apertures may vary depending on chemical or end-use application or preference, typically between 0.25 mm and 1.0 mm.

In addition to acting as both a storage receptacle for the tablet, or tablets and a built-in/internal "filter" able to prevent particulate matter from either blocking spray-nozzle apertures and/or resulting unwanted deposition of chemical on target-surfaces, during testing the applicant surprisingly discovered that the perforated packets served an important and unexpected technical function. Specifically, it is known that when a tablet is dissolved inside linear water flow the relative release—the "dose-rate"—will decline as the tablet dissolves. However, the applicant found that when a tablet is dissolved in a packet with very small perforations (<1.0 mm), a combination of water-flow deflection and the inability of particulate matter larger than 1.0 mm to escape the packet resulted in the formation of an aqueous chlorine concentrate inside the packet, and resulting in a more stable "buffered release" of chlorinated solution over the lifespan of the tablet, or tablets.

In another embodiment of the invention, the holder may be in the form of a rigid container, i.e. one that has rigid rather than flexible walls.

The method may include discharging aqueous disinfectant solution from the conduit through a discharge nozzle, for example as a spray or as a mist. The nozzle may, for example, be an atomising nozzle that atomises the water stream. In the case of medium flow, the atomising nozzle may be a micronizing nozzle, and in the case of low flow the atomising nozzle may be a misting nozzle.

The nozzle may be a nozzle that delivers a high flow rate, e.g. 500 to 750 litres per hour, or a medium flow rate, e.g. 100 to 500 litres per hour, or a low flow rate, e.g. 30 to 100 litres per hour. Thus, the method may include discharging aqueous disinfectant solution from the conduit at a flow rate in these ranges.

IN ACCORDANCE WITH A FOURTH ASPECT OF THE INVENTION IS PROVIDED a device for dissolving a soluble disinfectant in solid form in a stream of water flowing in a flow path, to provide an aqueous disinfectant solution in the flow path, the device including a hollow body defining an interior at least as a part of the flow path, into which the stream of water flowing in the flow path can be continuously fed in use, for disinfectant to be dissolved in the water to provide the aqueous disinfectant solution, and from which the aqueous disinfectant solution can be discharged; and a disinfectant holder located inside of the interior of the body upstream of a point of discharge from the interior of the body, the holder being configured to hold, in use, a tablet or a grouped plurality of tablets comprising a soluble disinfectant in solid form such that water of the water stream, when fed to the interior of the body in use, is directed onto the tablet or grouped plurality of tablets such that it impinges onto the tablet or grouped plurality of tablets, thereby to contact the tablet or at least some of the tablets and dissolve disinfectant therefrom to provide the aqueous disinfectant solution inside the holder.

The flow path may be provided be a conduit.

The interior of the body may, in itself, be in the form of an elongate conduit, which would in use effectively be an extension of, for example, a pipe in which the water stream that is in use fed to the interior of the body. Typically, the interior of the body would not be cylindrical, however, i.e. it would not have parallel walls along its full length.

For feeding the stream of water flowing in the conduit into the interior of the body and for withdrawing the aqueous disinfectant solution from the interior of the body, the body may have an inlet formation defining an inlet through which the stream of water flowing in the conduit can be fed into the interior of the body, and an outlet formation defining an outlet from which the aqueous disinfectant solution can be discharged from the interior of the body.

The holder may be as hereinbefore described in accordance with the third aspect of the invention. Thus, the holder may be in the form of a hollow receptacle. An interior of the receptacle would be in fluid communication with the interior of the body. Preferably, the receptacle is partly or fully open to the interior of the body in a direction generally facing the inlet defined by the inlet formation. In this sense, "partly open" effectively means discontinuously open, e.g. apertured, as opposed to continuously open.

The device may have a discharge nozzle at the outlet. The nozzle may be one that delivers high flow, medium flow or low flow as hereinbefore characterised in accordance with the third aspect of the invention. The nozzle may be an atomising nozzle that atomises the water stream. In particular, the atomising nozzle may be a micronizing or misting nozzle, as hereinbefore characterised in accordance with the third aspect of the invention.

The device may include a solids filter located upstream of the outlet, downstream of the holder. The solids filter may have an oversize specification of >0.5 mm or smaller i.e. such that the sieve retains particles larger than 0.5 mm, or larger than whatever smaller size specification it may have. In particular, the solids filter may be a sieve.

The location of the holder inside the interior of the body may be such that it is spaced from walls of the interior of the body, preferably from all of the walls of the interior of the body, e.g. being centrally disposed inside the interior of the body when the interior is viewed in cross section, such that water of the water stream can in use pass the holder on all sides thereof, in addition to impinging onto it.

THE INVENTION EXTENDS TO the device of the fourth aspect of the invention in use, wherein the holder holds a tablet or a grouped plurality of tablets comprising a soluble disinfectant in solid form.

The tablet or tablets of the grouped plurality of tablets may comprise the disinfectant in a granular format, having been compacted to form the tablet.

The disinfectant may be as hereinbefore characterised in accordance with the third aspect of the invention.

The tablet or at least some, and more typically all, of the tablets of the grouped plurality of tablets may include, in addition to the disinfectant, an effervescent agent.

The tablets of the grouped plurality of tablets would typically be arranged loosely in a random manner. In other words, the tablets would typically not be packed in an ordered manner. Arranging the tablets in an ordered manner is not absolutely excluded from the scope of the invention, however.

When one tablet is provided the tablet would also, typically, be loosely arranged inside the holder as hereinbefore described in accordance with the third aspect of the invention.

In a one embodiment of the invention, the grouped plurality of tablets may be grouped by a flexible apertured packet which contains the tablets, and which is in turn held by the holder. In such a case the holder would typically be continuously open as described above.

The packet may thus be one that has flexible (deformable) rather than rigid walls, at least some of which have apertures therein for water to access the interior of the packet and thus contact at least some of the tablets to dissolve disinfectant therefrom. For example, the packet may be of a synthetic plastics material, e.g. the packet may be of polypropylene, PET or HDPE.

In another embodiment of the invention, the grouped plurality of tablets may be grouped by the holder, in which case the holder may be discontinuously open as described above.

Thus, the applicant developed a disinfectant system capable of offering multiple end-users a solution with the following capabilities:

- To maintain a desired chemical dose-rate whether either ambient water temperature, or water-flow, is high or low, irrespective of what the end-user choice of hose-diameter might be.
- To deliver a range of custom formulated single-use tablet-based refill options for multiple technical scenarios that do not require the end-user to store unstable, wet chlorine in-between applications.
- To create a single dispensing system that is capable of dispensing different types of chlorine compounds or formulations with vastly differing dissolution rates (e.g. calcium hypochlorite vs sodium-dichloroisocyanurate).

IN ACCORDANCE WITH A FIFTH ASPECT OF THE INVENTION IS PROVIDED a method of dispensing a solution of soluble disinfectant in solid format into a stream of water flowing in a conduit, to provide an aqueous disinfectant solution for discharge from the conduit, the method including

- directing a main stream of water along a main conduit;
- diverting water out of the main conduit and directing it as a branch stream of water along a branch conduit, toward to a disinfectant dissolution zone in fluid communication with the main conduit and the branch conduit, the disinfectant dissolution zone containing soluble disinfectant in solid format, such that water of the branch stream of water contacts the soluble disinfectant in solid form in the dissolution zone and dissolves soluble disinfectant in solid form, thereby forming a disinfectant solution;
- in a flow modification zone that is at an effective distance upstream of the disinfectant dissolution zone artificially modifying the impact of the branch stream of water onto the disinfectant in solid format, by means of a flow modifying component that is located in the path of the branch stream of water; and
- introducing disinfectant solution into the main stream.

The main conduit and the branch conduit would typically each be defined by a pipe.

The branch conduit may have an upstream-facing inlet formation located in the main conduit and defining a branch conduit inlet, such that water of the main stream of water flowing along the main conduit flows into the branch conduit inlet and thus, as the branch stream of water, into and along the branch conduit. The branch conduit may also have an outlet formation located outside of the main conduit and defining a branch conduit outlet, through which the branch stream of water exits the branch conduit.

The dissolution zone and the modification zone may both be provided by a sump into which the branch conduit feeds from the main conduit. Thus, the branch conduit outlet may be located in, or may at least feed into, the sump. Preferably, the flow modifying component would be located at the branch conduit outlet, such that water exiting the branch conduit virtually immediately interacts, physically, with the flow modifying component.

The soluble disinfectant in solid format may be comprised by one or more tablets, i.e. in compressed or compacted particulate format. Each tablet may either consist of the disinfectant, or may comprise other chemical substances, also in particulate format, in addition to the disinfectant.

As mentioned, the disinfectant may, in particular, be a chlorine-based disinfectant. For example, the disinfectant may be selected from calcium hypochlorite, sodium dichloroisocyanurate (SDIC) and trichloroisocyanuric acid (TCCA). It is believed that the invention would be more marginally applicable to trichloroisocyanuric acid (TCCA), but this disinfectant is not excluded from the scope of the invention.

In one embodiment of the invention, a single tablet may be employed. In such an embodiment, the tablet may be arranged in the dissolution zone such that a surface thereof faces in a direction opposite to the direction of flow of the water stream in the branch conduit, i.e. faces in an upstream direction.

The surface of the tablet that faces in an upstream direction may be the only surface of the tablet that is accessible to water of the stream of water (hereinafter referred to as the "exposed surface"). In other words, remaining surfaces of the tablet may be isolated, i.e. closed off, from contact by water of the stream of water. Typically, the tablet may be held in a receptacle that thus respectively isolates and exposes the tablet.

It is noted that since the disinfectant is soluble, contact of the water of the stream of water with the tablet would generally axially erode the tablet at the exposed surface, such that the exposed surface thereby axially recedes, with the tablet thus being eroded evenly in and from a single direction.

In an alternative, and more preferred, embodiment of the invention, a plurality of tablets may be provided as a group of tablets. The tablets may be grouped in an ordered, e.g. packed, or random, e.g. loose, arrangement. Typically, the tablets would be located in, and therefore grouped by, a hollow, apertured holder, or container. In this sense, the term "holder" includes a structure that defines a hollow interior within which the tablet or tablets can be contained.

It will be appreciated that, being apertured, the holder, or container, would allow water of the stream of water to access and contact tablets of the grouped plurality of tablets. It will further be appreciated that the grouped plurality of tablets, being contained inside the holder, would be grouped by the holder.

The tablets of the grouped plurality of tablets would typically be arranged loosely in a random manner. In other words, the tablets would typically not be packed in an ordered manner. Arranging the tablets in an ordered manner is not absolutely excluded from the scope of the invention, however.

In a one embodiment of the invention, the holder may be in the form of a flexible packet, i.e. one that has flexible (deformable) rather than rigid walls. In such an embodiment, the packet may be of a synthetic, chlorine/oxidation-resistant plastics material, e.g. the packet may be of polypropylene, PET or HDPE. The flexible packet may have symmetrically spaced perforations across both its surfaces. The diameter of these apertures may vary depending on chemical or end-use application or preference, typically between 0.25 mm and 1.0 mm.

In addition to acting as both a storage receptacle for the tablets and a built-in/internal "filter" able to prevent particulate matter from either blocking spray-nozzle apertures and/or resulting unwanted deposition of chemical on target-surfaces, during testing the applicant surprisingly discovered that the perforated packets served an important and unexpected technical function. Specifically, it is known that when a tablet is dissolved inside linear water flow the relative release—the "dose-rate"—will decline as the tablet dissolves. However, the applicant found that when a tablet is dissolved in a packet with very small perforations (<1.0 mm), a combination of water-flow deflection and the inability of particulate matter larger than 1.0 mm to escape the packet resulted in the formation of an aqueous chlorine concentrate inside the packet, and resulting in a more stable "buffered release" of chlorinated solution over the lifespan of the tablet, or tablets.

Artificially modifying the impact of the stream of water onto the disinfectant may include, for example, any one or a combination of artificially increasing the flow velocity of water of the branch stream of water, artificially decreasing the flow velocity of water of the branch stream of water, and radially directing water of the branch stream of water (i.e. radially with respect to the direction of axial flow in the conduit) in the conduit. In accordance with the invention, such artificial modification would be effected by interaction of the branch stream of water with the flow modifying component.

For artificially modifying the impact of the branch stream of water onto the disinfectant by increasing the flow velocity of water of the branch stream of water, the flow modifying component may be configured to narrow the conduit. Thus, the flow modifying component may provide a conduit narrowing formation.

For artificially modifying the flow velocity by artificially decreasing the flow velocity or radially directing water of the branch stream of water, the flow modifying component may be configured to decrease the flow velocity through said radial direction of water of the branch stream of water. Thus, the flow modifying component may provide a radial flow directing formation.

When artificially modifying the flow velocity includes artificially decreasing the flow velocity or radially directing the branch stream of water, the flow modifying component may be configured such that it radially directs water of the branch stream of water in a direction away from the disinfectant dissolution zone, thus preventing direct impingement of water so directed onto the disinfectant in the disinfectant dissolution zone. Therefore, the flow modifying component may be configured partly or fully to shelter the disinfectant from such direct impingement. It would be appreciated that included within the scope of the invention are both embodiments in which all of the water of the branch stream of water is so directed, or only some of the water of the branch stream of water is so directed.

The method may include delivering aqueous disinfectant solution from the conduit by means of a nozzle. The nozzle may be a nozzle that delivers a high flow rate, e.g. 500 to 750 litres per hour, or a medium flow rate, e.g. 100 to 500 litres per hour, or a low flow rate, e.g. 30 to 100 litres per hour. The nozzle may, for example, be an atomising nozzle that atomises the water stream. In the case of medium flow, the atomising nozzle may be a micronizing nozzle, and in the case of low flow the atomising nozzle may be a misting nozzle. Therefore, the method may include delivering aqueous disinfectant solution from the conduit at a flow rate within these ranges.

The flow modifying component may, in particular, be a flow modifying component as described according to the first and second aspects of the invention.

IN ACCORDANCE WITH A SIXTH ASPECT OF THE INVENTION IS PROVIDED a device for dissolving a soluble disinfectant in solid form in a stream of water flowing in a conduit to provide an aqueous disinfectant solution, the device comprising

- a body defining a main conduit along which a main stream of water can be directed;
- a disinfectant dissolution zone outside of the conduit, in which a soluble disinfectant in solid format is in use located;
- a body defining a branch conduit along which a branch stream of water, diverted from the main stream of water, can be directed toward the disinfectant dissolution zone; and
- a flow modification zone outside of the conduit at an effective distance upstream of the disinfectant dissolution zone, in which flow modification zone a flow modifying component is located such that the flow modifying component is in use located in the path of water of the branch stream of water, wherein the flow modifying component is configured artificially to modify the impact of water of the branch stream of water onto the disinfectant.

The main conduit, the branch conduit, the flow modification zone, the disinfectant dissolution zone, the soluble disinfectant in solid format, and the flow modifying component may all be as hereinbefore described according to the fifth aspect of the invention.

The main conduit may have a discharge nozzle defining a point of discharge. Thus, the tablet or grouped plurality of tablets would be located upstream of the discharge nozzle as well.

The nozzle may be a nozzle that delivers a high flow rate, e.g. 500 to 750 litres per hour, or a medium flow rate, e.g. 100 to 500 litres per hour, or a low flow rate, e.g. 30 to 100 litres per hour. The nozzle may, for example, be an atomising nozzle that atomises the water stream. In the case of medium flow, the atomising nozzle may be a micronizing nozzle, and in the case of low flow the atomising nozzle may be a misting nozzle.

THE INVENTION EXTENDS TO the device according to the sixth aspect of the invention in use, in which a stream of water is directed along the conduit in accordance with the method of the invention.

AS A SEVENTH ASPECT OF THE INVENTION, THERE IS PROVIDED a kit comprising the device of the second or sixth aspects of the invention and flow modifying components of one or more of the types of the first to fifth embodiments thereof described with reference to the first and second embodiments of the invention.

BRIEF DESCRIPTION OF THE DRAWINGS

THE INVENTION WILL NOW BE DESCRIBED IN MORE DETAIL with reference to the accompanying drawings in which.

DETAILED DESCRIPTION OF EXEMPLARY EMBODIMENTS OF THE INVENTION

Exemplary Embodiment 1

Figure 1:
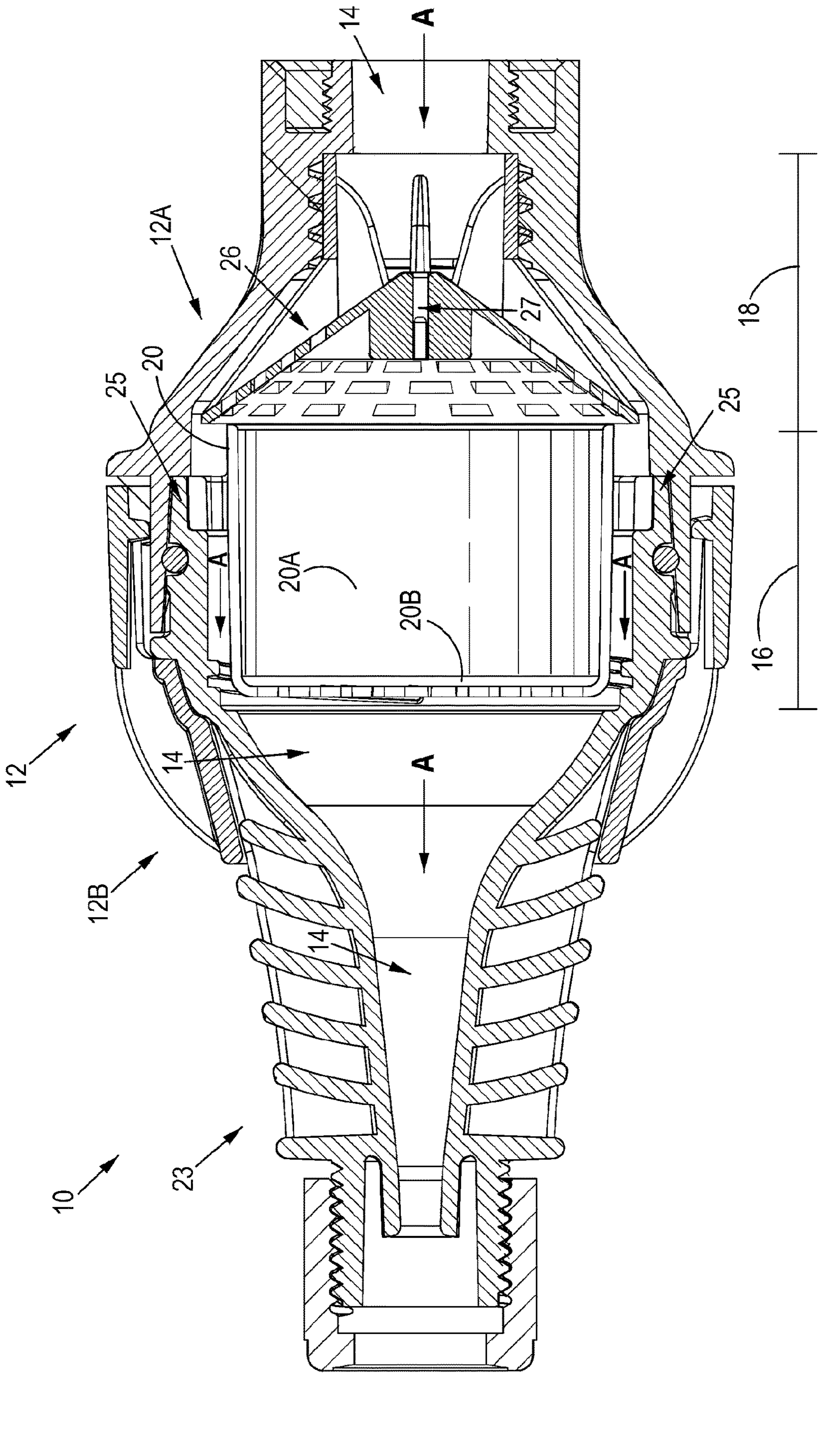
FIG. 1 shows, in sectional side view, one embodiment of a device according to the second aspect of the invention, in an assembled configuration.
Figure 2:
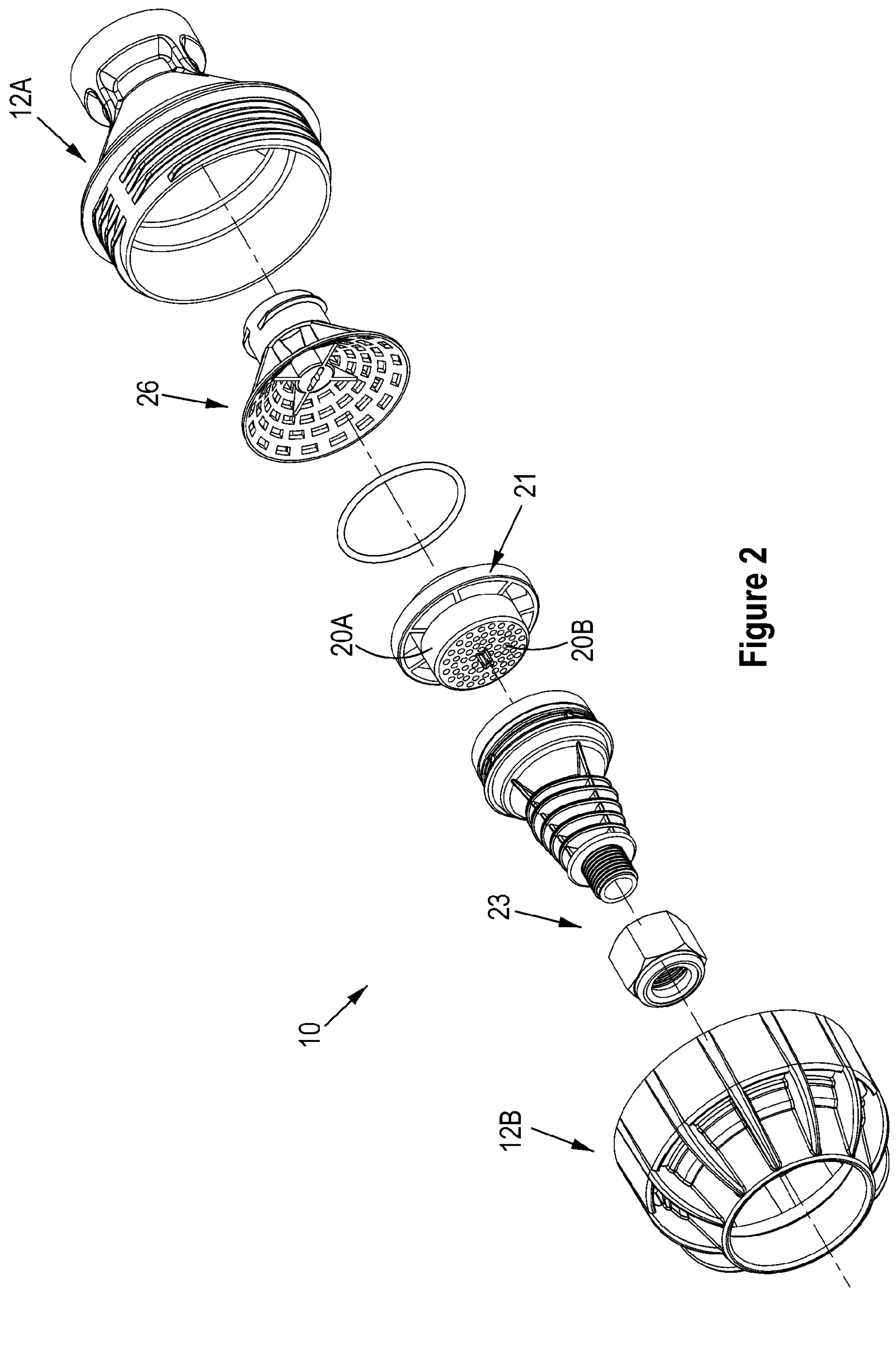
FIG. 2 shows the device of FIG. 1 in three-dimensional view, in a disassembled configuration.
Figure 3A:
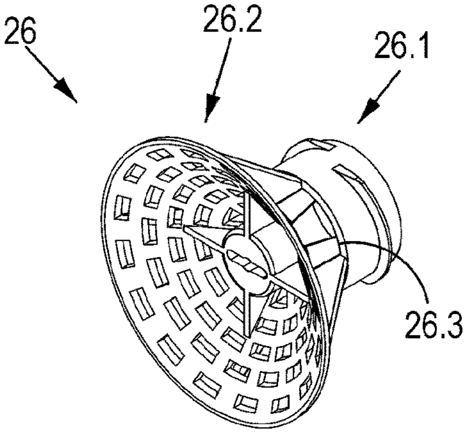
FIGS. 3*a* to *h* show various views of one embodiment of a flow modifying component.
Figure 3B:
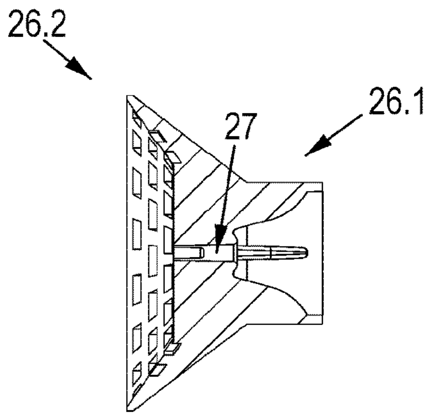
Figure 3C:
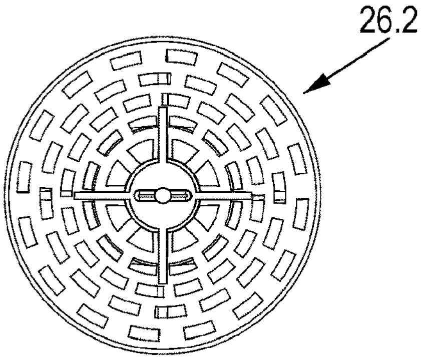
Figure 3D:
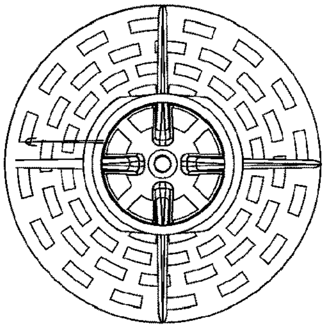
Figure 3E:
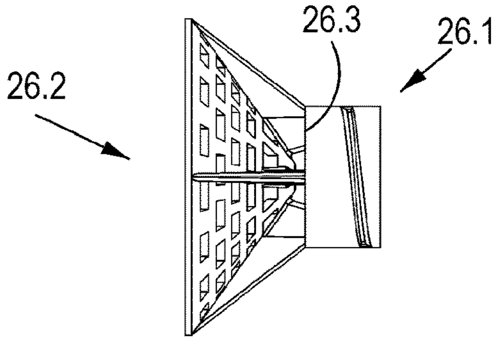
Figure 3F:
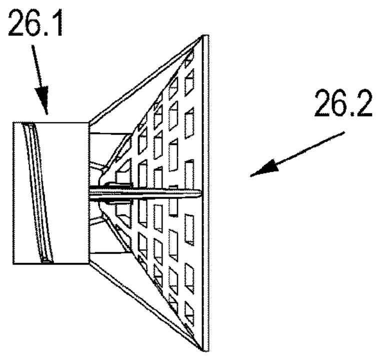
Figure 3G:
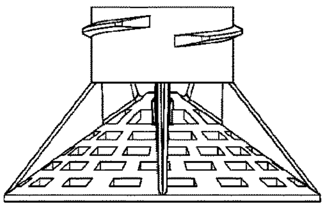
Figure 3H:
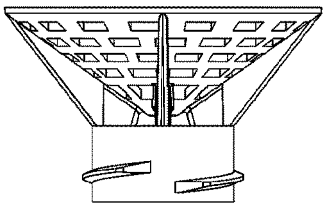
Figure 4A:
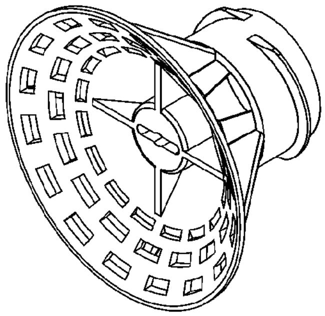
FIGS. 4*a* to *h* show various views of another embodiment of a flow modifying component.
Figure 4B:
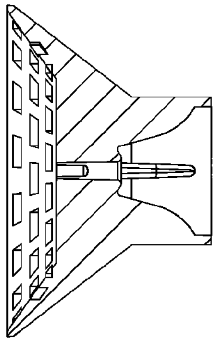
Figure 4C:
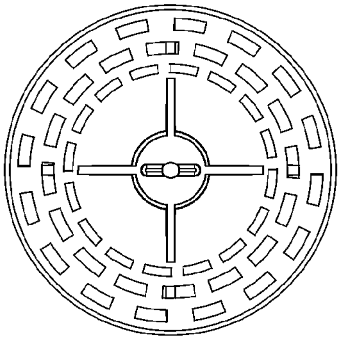
Figure 4D:
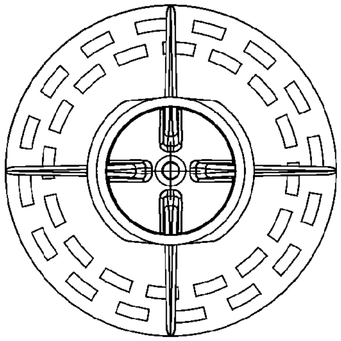
Figure 4E:
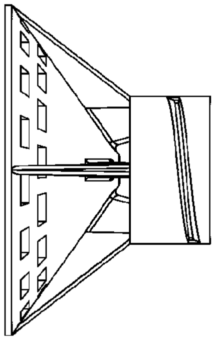
Figure 4F:
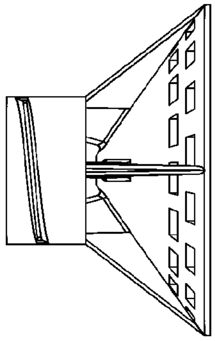
Figure 4G:
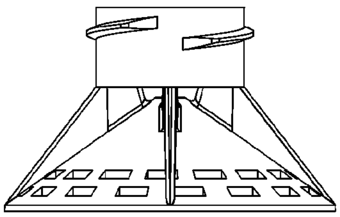
Figure 4H:
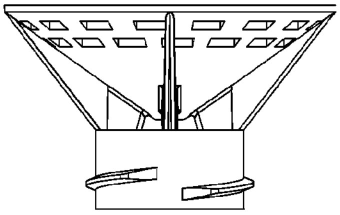
Figure 5A:
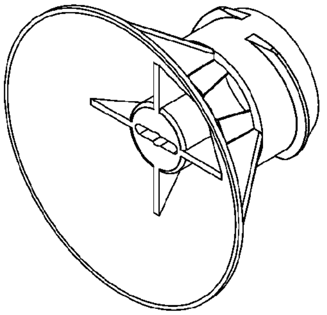
FIGS. 5*a* to *h* show various views of yet another embodiment of a flow modifying component.
Figure 5B:
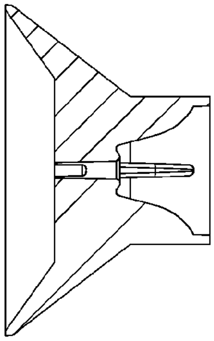
Figure 5C:
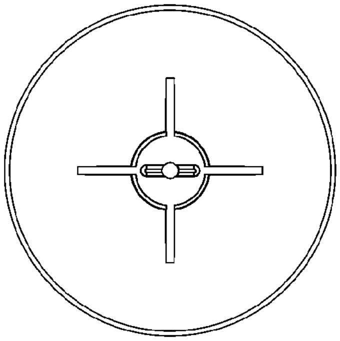
Figure 5D:
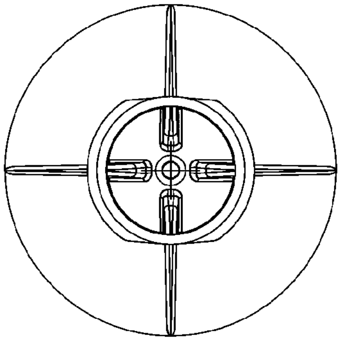
Figure 5E:
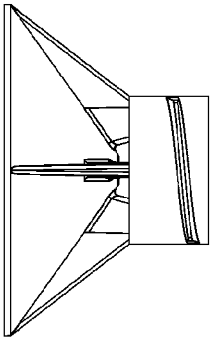
Figure 5F:
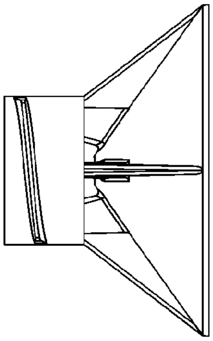
Figure 5G:
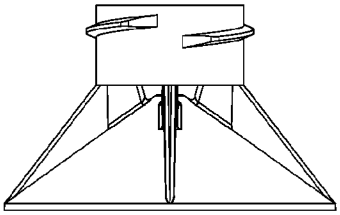
Figure 5H:
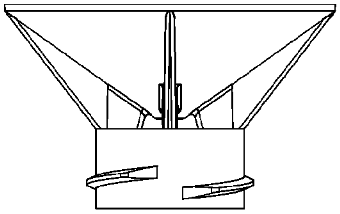
Figure 6A:
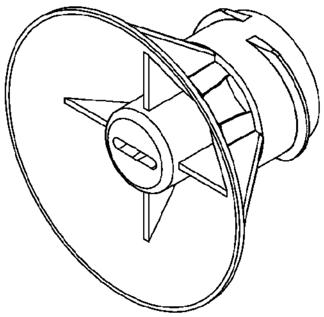
FIGS. 6*a* to *h* show various views of a further embodiment of a flow modifying component.
Figure 6B:
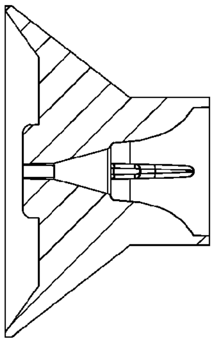
Figure 6C:
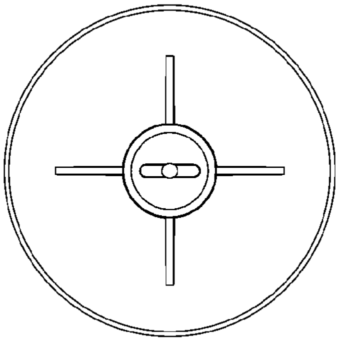
Figure 6D:
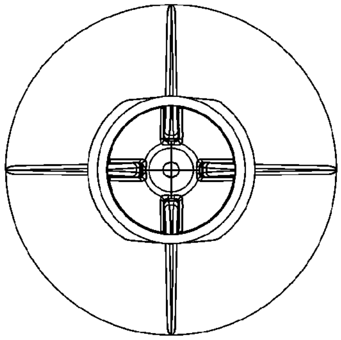
Figure 6E:
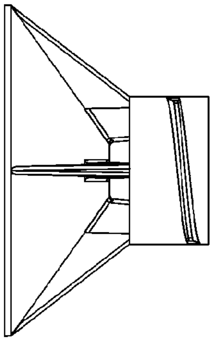
Figure 6F:
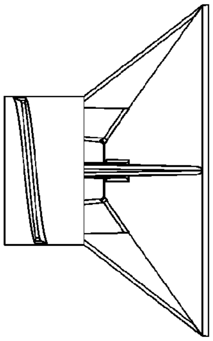
Figure 6G:
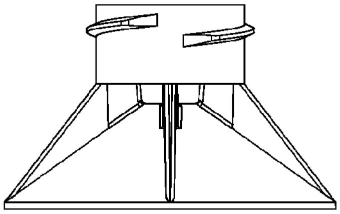
Figure 6H:
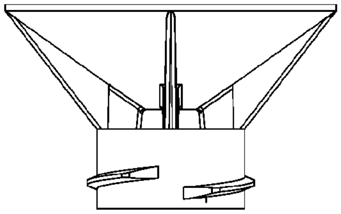
Figure 7A:
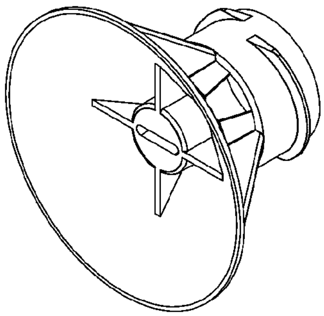
FIGS. 7*a* to *h* show various views of yet a further embodiment of a flow modifying component.
Figure 7B:
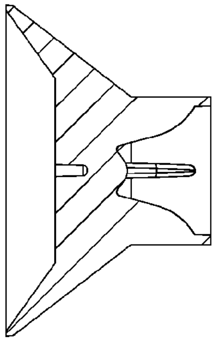
Figure 7C:
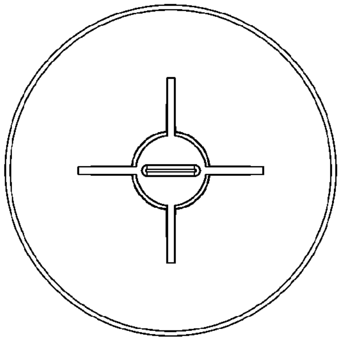
Figure 7D:
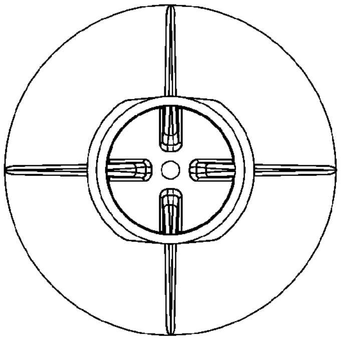
Figure 7E:
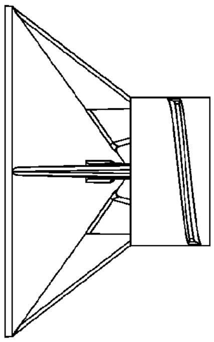
Figure 7F:
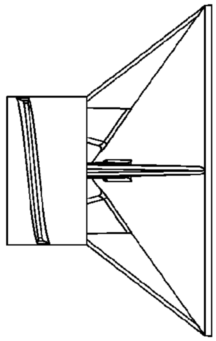
Figure 7G:
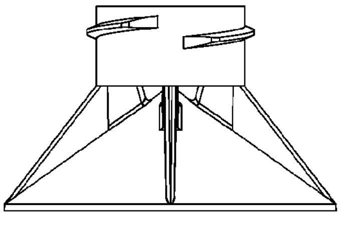
Figure 7H:
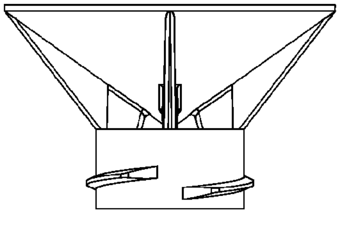
Figure 8A:
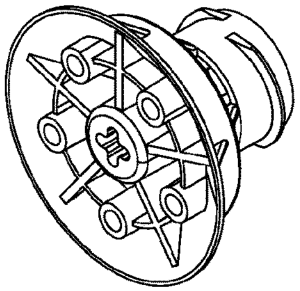
FIGS. 8*a* to *h* show various views of still a further embodiment of a flow modifying component.
Figure 8B:
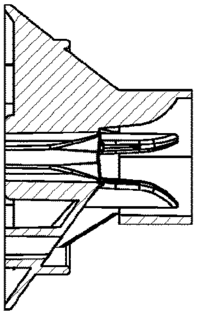
Figure 8C:
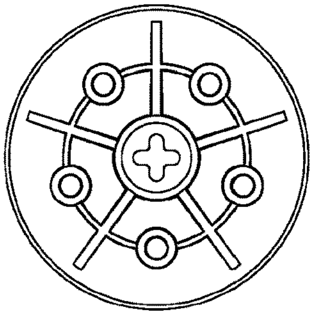
Figure 8D:
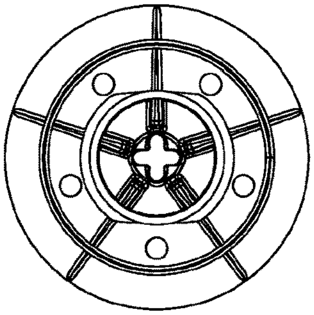
Figure 8E:
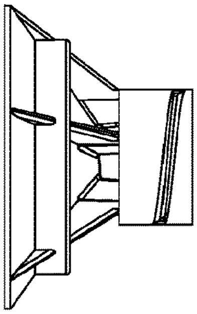
Figure 8F:
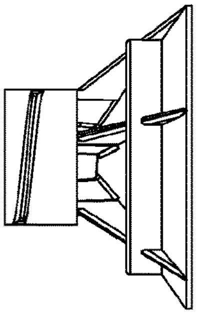
Figure 8G:
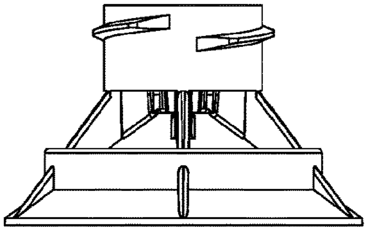
Figure 8H:
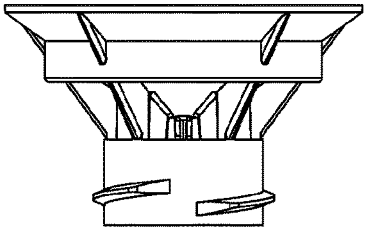

REFERRING TO THE DRAWINGS and particularly to FIGS. 1 and 2, reference numeral 10 generally indicates one embodiment of a disinfectant dispensing device according to the second aspect of the invention, for performing a method according to the first aspect of the invention.

The device 10 comprises a hollow body 12 that provides a flow channel (conduit) 14 defining a flow path along which a stream of water can in use be directed in the direction of the arrows "A".

Upstream of the flow channel 14, a pipe would typically in use be provided, thus extending the flow channel 14 and therefore also the flow path. Water would, in use, be delivered to the device 10 along the pipe. Thus, the device 10 would be in line with the pipe.

The body 12 comprises an upstream part 12A and a downstream part 12B that engage in a screwing manner by means of complemental screw threads.

The upstream part 12A includes internal screw thread for screwing engagement of complemental screw thread on the cylindrical part of the flow modifying component hereinafter described, thereby to mount the flow modifying component to the body 12.

The device also includes a nozzle 23 that clips into the upstream part 12A of the body 12 and projects through an aperture provided therefor in the downstream part 12B of the body 12.

The device 10 provides a disinfectant dissolution zone 16 and a flow modification zone 18, with characteristics as hereinafter described. It will be appreciated that the body 12 of the device 10, and therefore the flow channel 14, has an increased diameter in providing the zones 16, 18 compared to the diameter of the body 12, and thus of the flow channel 14, upstream of these zones 16, 18.

The disinfectant dissolution zone 16 comprises a receptacle 20. The receptacle 20 is open in an upstream direction and has a circumferentially extending wall 20A integral with a downstream end wall 20B that is apertured for water to flow through it in use. It will be appreciated that the receptacle 20 is cross-sectionally centrally located in the conduit 14, and that the disinfectant when contained therein would therefore also be so centrally located.

The receptacle 20 is held by a framed radially extending support structure 21 with which it is integral.

The support structure 21 assists in locating the receptacle 20 in the body 12 and with respect to the nozzle 23. More specifically, the support structure 21 abuts against a shoulder 25 provided therefor in the nozzle 23, thus being located with respect to the nozzle 23. Locating the nozzle 23 with respect to the body 12, and more specifically the upstream part 12A thereof, thus also locates the receptacle 20 in the body 12.

The support structure 21 is framed such that water can flow through it, and thus around the receptacle 20, in use. As will be appreciated from the description that follows, at least some water would also flow through the receptacle 20.

The receptacle 20 holds, in use (not currently illustrated), a foraminous non-rigid holder as envisaged by the invention, in the form of a foraminous bag or packet, that contains one or more typically, a plurality of grouped tablets comprising water-soluble disinfectant in solid format.

The packet would be of a synthetic, chlorine/oxidation-resistant plastics material, e.g. the packet may be of polypropylene, PET or HDPE. The flexible packet may have symmetrically spaced perforations across both its surfaces. The diameter of these apertures may vary depending on chemical or end-use application or preference, typically between 0.25 mm and 1.0 mm.

As mentioned, in other embodiments in accordance with the invention, the tablet may be arranged in the dissolution zone, by the receptacle, such that a surface thereof faces in a direction opposite to the direction of flow of the water stream in the conduit, i.e. faces in an upstream direction. The surface of the tablet that faces in an upstream direction may be the only surface of the tablet that is accessible to water of the stream of water (hereinafter referred to as the "exposed surface"). In other words, remaining surfaces of the tablet may be isolated, i.e. closed off, from contact by water of the stream of water. Typically, the tablet may be held in a receptacle that thus respectively isolates and exposes the tablet. It is noted that since the disinfectant is soluble, contact of the water of the stream of water with the tablet would generally axially erode the tablet at the exposed surface, such that the exposed surface thereby axially recedes, with the tablet thus being eroded evenly in and from a single direction. Such an embodiment of the invention is discussed in more detail as Exemplary Embodiment 2, below.

Returning to the current embodiment, in use, water contact with the tablets in the non-rigid container dissolves disinfectant from the tablets, thus forming an aqueous disinfectant solution in the packet which seeps out of the packet into the dissolution zone 16 and is ultimately discharged from an outlet 23 of the device 10.

The flow modification zone 18 comprises a flow modifying component 26, which is illustrated in more detail in FIGS. 3*a* to *h*. The flow modifying component 26 of FIG. 3 is one according to the second embodiment thereof according to the first and second aspects of the invention.

The flow modifying component 26, as illustrated in more detail in FIGS. 3*a* to *h*, comprises a hollow cylindrical part 26.1 and a flared part 26.2 that radiates forwardly (downstream in use) from the cylindrical part 26.1.

The flared part 26.2 forms part of a substantially conical body of the flow modifying component 26, having an apex that faces in an upstream direction and is located cross-sectionally centrally in the conduit 14. The cylindrical part 26.1 is located coaxially with the apex.

A downstream edge of the flared part 26.2 provides a maximum diameter thereof, which diameter approximates a maximum diameter of the flow modification zone 18.

The flared part 26.2 is apertured, with a plurality of apertures being defined in it.

A forward edge 26.3 of the cylindrical part 26.1 is spaced from the flared part 26.2 such that, in use, water that enters the cylindrical part 26.1 impinges on the flared part 26.2 and is radially directed by the flared part 26.2 between the cylindrical part 26.1 and the flared part 26.2, such that some of it passes over the flared part 26.2 and some of it passes through the apertures therein.

As mentioned above, the flow modifying component 26 is located with its cylindrical part 26.1 screwed into the upstream part 12.1 of the body 12. Thus, in the assembled configuration of the device 10 as shown in FIG. 1, the flared part 26.2 of the flow modifying component 26 faces and thus shelters the receptacle 20, and therefore the tablets, from the full force of the incoming stream of water flowing along the conduit 14.

As illustrated in FIG. 1, the part of the conduit 14 upstream of the flow modification zone 18 leads directly into the cylindrical part 26.1 of the flow modifying component 26, such that water of a stream of water flowing in that part of the conduit 14 in use is radially directed by the flow modifying component 26 in the manner hereinbefore described.

Such radial direction of water of the stream of water by the flow modifying component 26 avoids direct impingement of all of the water of the stream of water onto tablets located in the receptacle 20 and effectively disperses some of that water, thus reducing its velocity.

It is noted, however, that the flow modifying component 26 includes a central bore 27 through the apex, providing a flow path narrowing formation. The flow path narrowing formation allows for some water of the stream of water directly to impinge upon the tablets in the receptacle 20, with the velocity of such water being increased at a constant volumetric flow rate. Also, such water is axially directed by the flow path narrowing formation that provides the bore 27. Thus, such water is focused on the disinfectant in the dissolution zone 16.

The applicant has found that employment of the flow modifying component 26 modifies the flow velocity of water in the disinfectant dissolution zone 16 such that a concentrated intermediate disinfectant solution forms independently within the packet that contains the tablets, and also within disinfectant dissolution zone 16, at least through direct abrasive impingement of water of the stream of water flowing through the bore 27 onto the disinfectant.

This intermediate disinfectant solution is then drawn into water flowing over, past, and through the flared part 26.2 of the flow modifying component 26, thereby forming a diluted final disinfectant solution that is discharged through the nozzle 23. Dissolution of disinfectant and formation of a disinfectant solution is therefore essentially driven by water passing through the bore 27, and dispensing of the disinfectant solution is essentially driven by water flowing over, past, and through the flared part 26.2.

The applicant has further found that, thus, the concentration of the final disinfectant solution that is discharged through the nozzle 23 is sustained between desired limits for a longer period of time than when flow of the stream of water is not modified in the manner disclosed by the current invention.

In this regard, the applicant has also found the employment of the receptacle 20 and, more specifically, the foraminous container, particularly advantageous, in that the concentrated intermediate solution is contained within the foraminous container, being drawn from it over a prolonged period of time compared to when it is not used.

The applicant still further surprisingly found that different configurations of the flow modifying component achieves effective modification in different circumstances, e.g. depending on pressure, temperature and selected disinfectant.

In the device 10 the flow modifying component 26 may routinely be substituted with alternative embodiments thereof, as illustrated in FIGS. 4 to 8, depending on operating conditions. These alternative embodiments provide for various alternative flow modifications and can be employed selectively further to exercise control over the dissolution of disinfectant from the tablets in the receptacle 20, depending on operating conditions such as local pressure, temperature, and selected disinfectant.

More specifically, the embodiments of the flow modifying component 26 that are expressly provided, in addition to the FIG. 3 embodiment are:

- an embodiment, as illustrated in FIG. 4, which is according to the second embodiment thereof described according to the first and second aspects of the invention, in which there are fewer apertures in the flared part than in the flared part of the embodiment illustrated in FIG. 3, thus further reducing flow velocity of water flowing across and through the flared part in use;

- an embodiment, as illustrated in FIG. 5, which is according to the first embodiment thereof described according to the first and second embodiments of the invention, in which there are no apertures in the flared part and all the water of the stream of water, except that passing through the bore, is radially directed by the flared part to pass between its downstream edge and walls of the flow conduit 14 defining the flow modification zone 16, thus still further reducing the velocity of such water;
- an embodiment as illustrated in FIG. 6, which is according to the first embodiment thereof described according to the first and second embodiments of the invention, which is similar to the embodiment of FIG. 5 except that the bore 27 is conical in a downstream direction, further to increase the velocity of water flowing through the bore 27;
- an embodiment as illustrated in FIG. 7, which is according to the fourth embodiment thereof described according to the first and second embodiments of the invention, which is also similar to the embodiment of FIG. 5 except that the bore is omitted with all of the water of the stream of water thus being radially directed by the flared part, thus slowing the velocity of the water flowing across the flared part even further and avoiding any direct impingement of water of the stream of water onto the disinfectant; and
- an embodiment as illustrated in FIG. 8, which is according to the fifth embodiment thereof described according to the first and second embodiments of the invention, which includes a "plus" (+) shaped central bore in the cylindrical part and a plurality of bore defining formations in the flared part, provided as an embodiment to effect maximum abrasive force on the disinfectant.

Exemplary Embodiment 2

Figure 9:
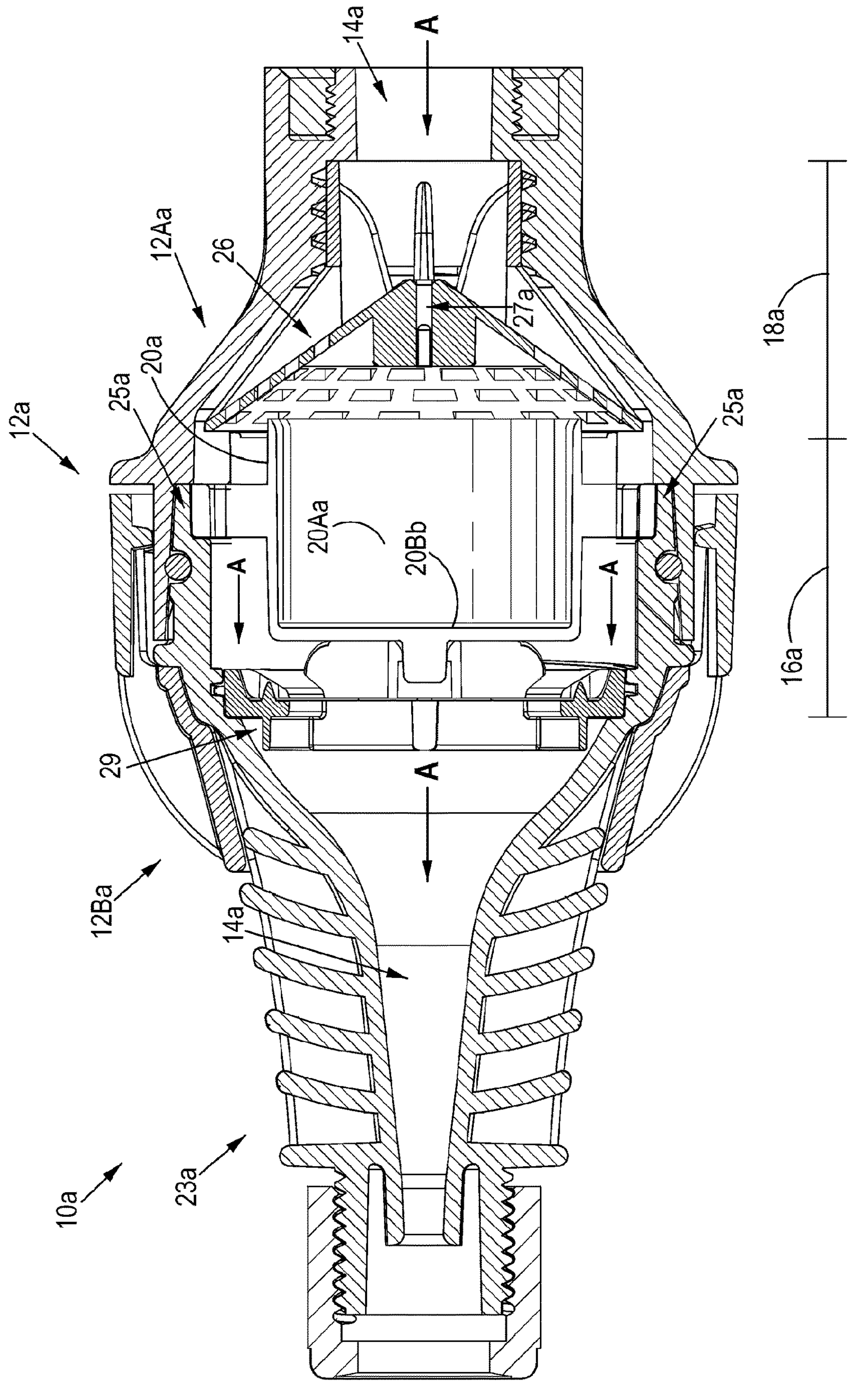
FIG. 9 shows, in sectional side view, another embodiment of a device according to the first aspect of the invention, in an assembled configuration.
Figure 10:
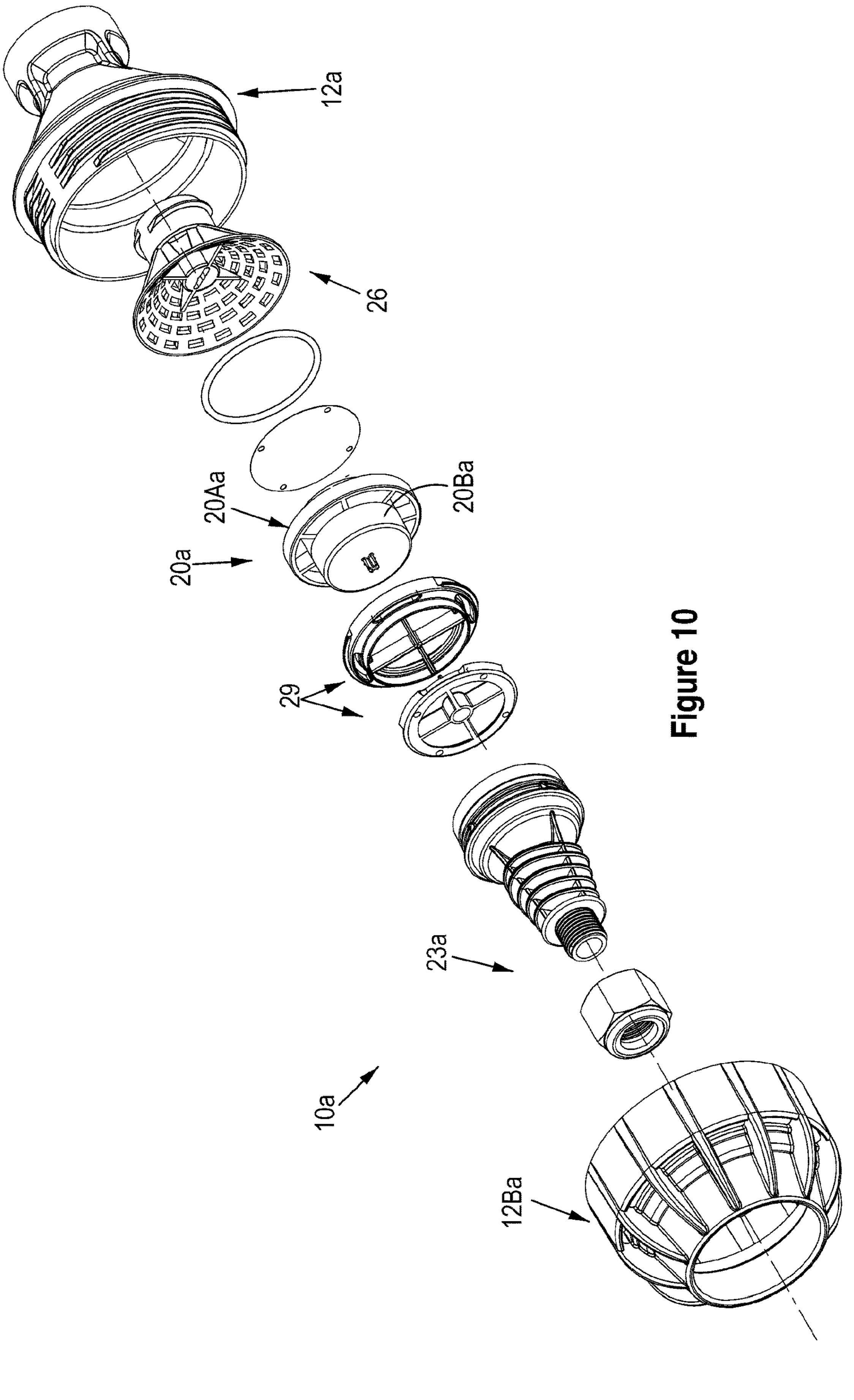
FIG. 10 shows the device of FIG. 9 in three-dimensional view, in a disassembled configuration.

Referring now to FIGS. 9 and 10, and using the same reference numerals with the suffix "a" to reference parts in common with the device 10, reference numeral 10*a* generally indicates another embodiment of a disinfectant dispensing device according to the second aspect of the invention, for performing a method according to the first aspect of the invention.

The device 10*a* comprises a body 12*a* providing a flow channel (conduit) 14*a* defining a flow path along which a stream of water can be directed in the direction of the arrows "A".

The body comprises an upstream part 12Aa and a downstream part 12Ba that engage in a screwing manner by means of complemental screw threads.

The upstream part 12Aa includes internal screw thread for screwing engagement of complemental screw thread on the cylindrical part of the flow modifying component hereinafter described, thus to mount the flow modifying component to the body 12*a*.

The device also includes a nozzle 23*a* that clips into the upstream part 12Aa of the body 12 and projects through an aperture provided therefor in the downstream part 12Ba of the body 12*a*.

The device 10*a* defines a disinfectant dissolution zone 16*a* and a flow modification zone 18*a*, with characteristics as hereinafter described.

The disinfectant dissolution zone 16*a* comprises a receptacle 20*a*. The receptacle 20 is open in an upstream direction and has a circumferentially extending wall 20Aa integral with a downstream end wall 20Ba, both of which are continuous.

The receptacle 20*a* is held by a framed radially extending support structure 21*a* with which it is integral. The support structure 21*a* assists in locating the receptacle 20*a* in the body 12*a*, and with respect to the nozzle 23*a*. More specifically, the support structure 21*a* abuts against a shoulder 25*a* provided therefor in the nozzle 23*a*, thus being located with respect to the nozzle 23*a*. Locating the nozzle 23*a* with respect to the body 12*a*, and more specifically the upstream part 12Aa thereof, thus also locates the receptacle 20*a* in the body 12*a*.

The support structure 21*a* is framed such that water can flow through it, and thus around the receptacle 20*a*, in use. No water would flow through the receptacle 20*a*.

The receptacle 20*a* would in use hold a tablet comprising a water-soluble disinfectant chemical in compacted particular form such that a surface of the tablet faces in a direction opposite to the direction of flow of the water stream in the conduit, i.e. faces in an upstream direction. The surface of the tablet that faces in an upstream direction would be the only surface of the tablet that is accessible to water of the stream of water (hereinafter referred to as the "exposed surface"). In other words, remaining surfaces of the tablet would be isolated, i.e. closed off, from contact by water of the stream of water, by the receptacle 20*a*. Typically, the tablet would be held in the receptacle 12 that thus respectively isolates and exposes the tablet. It is noted that since the disinfectant is soluble, contact of the water of the stream of water with the tablet would generally axially erode the tablet at the exposed surface, such that the exposed surface thereby axially recedes, with the tablet thus being eroded evenly in and from a single direction.

Downstream of the receptacle 20*a*, a solids filter 29 in the form of a sieve is provided. The solids filter has an oversize specification of >0.5 mm, but may have a smaller oversize specification.

The flow modification zone 18*a* comprises the flow modifying component 26, as in the case of the first exemplary embodiment of the device 10, and can be selected from the embodiments illustrated in more detail in FIGS. 3*a* to *h*, as discussed above.

The functional significance of the flow modifying component 26 is as discussed with reference to the first exemplary embodiment above. Thus, the flow modifying component 26 reduces the flow velocity of water in the disinfectant dissolution zone, thus artificially modifying the dissolution of the tablet compared to when water of the stream of water would have been directly incident on the tablet.

The applicant has surprisingly found that, also in this case, the concentration of the final disinfectant solution that is discharged through the nozzle 23*a* is sustained between desired limits for a longer period of time than when flow of the stream of water is not modified in the manner disclosed by the current invention.

Different configurations of the flow modifying component may be selected as discussed earlier with reference to the first exemplary embodiment.

Exemplary Embodiment 3

Figure 11:
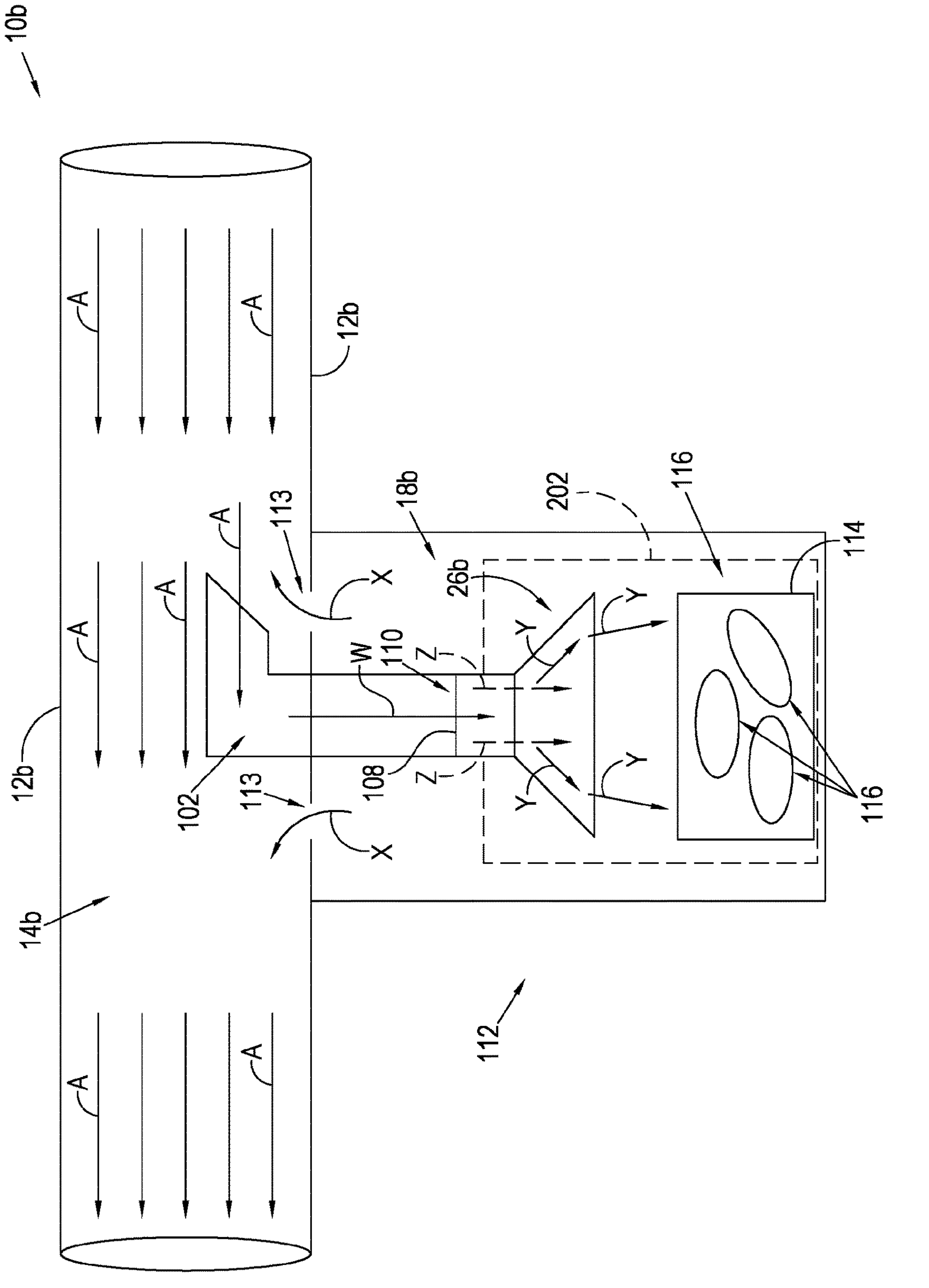
FIG. 11 shows, diagrammatically, a device according to the sixth aspect of the invention.

Referring now to FIG. 11, reference numeral 10*b* generally indicates a device according to the sixth aspect of the invention, for performing a method according to the fifth aspect of the invention.

The device 10*b* is a modified version of a commercially available disinfectant dispensing device. The commercial device differs from the device 10*b* described below in the manner described later with reference to features numbered in the number range 200.

The device 10*b* comprises a body 12*b* defining a main flow channel 14*b* in the form of a pipe along which a main stream of water can be directed in the direction of the arrows "A".

The device 10*b* further includes a branch flow channel 102 in the form of a pipe, having an upstream facing inlet formation 104, defining a branch inlet 106, located in the main flow channel 14*b*, and an outlet formation 108 defining a branch outlet 110 located outside the main flow channel 14*b*. The branch flow channel 102 thus extends through the body 12*b* of the main flow channel 14*b*. In use, water of the main stream of water flowing along the main flow channel 14 would enter the branch flow channel 102 through the inlet 106, thus forming a branch stream of water flowing along the branch flow channel 102 in the direction of the arrow W, ultimately exiting the branch flow channel 102 through the branch outlet 110.

The device 10 defines a disinfectant dissolution zone 16*b* and a flow modification zone 18*b*. The zones 16*b*, 18*b* are defined in a sump 112 that is attached to body 12*b* of the main flow channel 14*b*. The outlet formation 108, and therefore the outlet 110, are located in the sump 112.

In the dissolution zone 16*b*, a foraminous non-rigid holder as envisaged by the third to sixth aspects of the invention, in the form of a foraminous bag or packet 114, that contains a plurality of grouped tablets 116 comprising water-soluble disinfectant in solid format, is located.

The packet 114 is of a synthetic, chlorine/oxidation-resistant plastics material, e.g. the packet may be of polypropylene, PET or HDPE. The flexible packet may have symmetrically spaced perforations across both its surfaces. The diameter of these apertures may vary depending on chemical or end-use application or preference, typically between 0.25 mm and 1.0 mm.

In use, water contact with the tablets in the non-rigid container dissolves disinfectant from the tablets, thus forming an aqueous disinfectant solution in the packet 114, which seeps through apertures in the packet to create a second disinfectant solution in the sump 112, which second disinfectant solution is discharged from the sump 112 in the direction of the arrows "X" through apertures 113 extending between the interior of the sump 112 and the main flow conduit 14. In use, such discharge would be as a result of the venturi-effect, caused by the continued flow of water along the main flow conduit 14, i.e. with disinfectant solution being drawn out of the sump 112 through the apertures 113 as a result of the continued flow of water along the main conduit 14.

The flow modification zone 18*b* comprises a flow modifying component 26, which is located at the outlet 110 for water of the branch stream of water flowing along the branch conduit to interact physically with the flow modifying component 26 virtually immediately when exiting the branch conduit 102. The flow modifying component 26 is illustrated in more detail in FIGS. 3*a* to *h* and is as described above.

Thus, with reference to FIG. 3, The flow modifying component 26 comprises a hollow cylindrical part 26.1 and a flared part 26.2 that radiates forwardly from the cylindrical part 26.1. The flared part 26.2 is apertured, with a plurality of apertures being defined in it.

The flow modifying component 26 is located with its cylindrical part 26.1 attached to the outlet formation 108 of the branch channel 102. The branch channel 102 therefore leads directly into the cylindrical part 26.1 of the flow modifying component 26, such that water of the branch stream of water in use is radially directed by the flow modifying component 26 in the direction of the arrows Y.

Such radial direction of water of the stream of water by the flow modifying component 26 in the direction of the arrows Y avoids direct impingement of water of the stream of water onto tablets located in the dissolution zone.

Therefore, in use, water of the main stream of water flowing along the main flow conduit 14*b* in the direction of the arrows A enters the branch conduit 102 through the inlet 106 thereof and flows, as a branch stream of water, along the branch conduit 102, exiting it at the outlet 110 and interacting with the flow modifying component 26 in the manner hereinbefore described, eventually contacting the tablets 116 in the dissolution zone 16*b* and causing dissolution of disinfectant therefrom, thus forming a first disinfectant solution in the packet 114 which seeps through the apertures in the packet 114 to form a second disinfectant solution in the sump 112, which second disinfectant solution is introduced into the main stream flowing in the main conduit 102 through the apertures 113 as a result of the venturi effect.

The commercially available device on which the device 10*b* is based, and that the present invention modifies to provide the device 10*b*, omits the flow modifying component 26 and does not employ disinfectant tablets contained in a foraminous packet, as hereinbefore described. Instead, the commercially available device has a jet nozzle at the outlet 108 of the branch channel and employs a cylindrical block 202 of disinfectant, extending from the base of the sump to near the jet nozzle, which block 202 of disinfectant is held in a water-tight sleeve that exposes radial (operatively top and bottom) ends thereof. In use, the jet nozzle jets water onto the open operatively top end of the block 202 of disinfectant, thereby to abrasively to dislodge and dissolve disinfectant from the block of disinfectant.

The approach employed by the commercial device has been found by the applicant to be undesired and, in fact, technically unsound, since at some point, the erosion of the block 202 of disinfectant, due to its abrasion and dissolution by the jet of water directed onto it, causes the exposed end of the block 202 of disinfectant to move out of reach of the direct effect of the jet of water. Thus, the dissolution profile changes, as does disinfectant concentration in the sump 112. The exposed bottom end of the block of disinfectant also constantly rests in a pool of water, and is therefore eroded as well, which is undesired. The applicant has found it extremely difficult to obtain a consistent disinfectant concentration in the main stream of water using the commercially available device.

The applicant has surprisingly found that employment of the flow modifying component 26, however, reduces the flow velocity of water in the disinfectant dissolution zone 16*b* in such a manner that allows for a concentrated intermediate disinfectant solution to form independently within the disinfectant dissolution zone 16*b*.

The applicant has further surprisingly found that, thus, the concentration of the final disinfectant solution that is discharged through the nozzle 23*b* is sustained between desired limits for a longer period of time than when flow of the stream of water is not modified in the manner disclosed by the current invention.

In this regard, the applicant has also found the employment of the foraminous container particularly advantageous, in that a concentrated intermediate solution is contained within the foraminous container, being drawn from it over a prolonged period of time.

The applicant still further surprisingly found that different configurations of the flow modifying component achieves effective modification in different circumstances, e.g. depending on pressure, temperature and selected disinfectant.

Thus, in the device 10 the flow modifying component 26 may routinely be substituted with alternative embodiments thereof, as illustrated in FIGS. 4 to 8, depending on operating conditions, as discussed earlier.

DISCUSSION

THE MODIFICATION OF FLOW provided by the invention and the flow modifying components for effecting it are regarded as addressing the difficulties hereinbefore outlined.

Thus, it is now possible for a user of a disinfection device that creates a disinfectant solution in the manner herein described, to use the device sustainably and within desired disinfectant concentration ranges over material flow velocity variances between water supply points by employing a variety of flow modifying components.

Furthermore, even where such difficulties are not encountered, the flow modifying components provide additional control parameters that would otherwise not be available to users, and can be exploited to exercise more versatile control over the disinfectant dosing into flowing streams of water.

Thus, to overcome the challenges set out hereinbefore, the applicant developed a disinfectant system capable of offering multiple end-users a solution with the following capabilities:

- To maintain a desired chemical dose-rate whether either ambient water temperature, or water-flow, is high or low, irrespective of what the end-user choice of hose-diameter might be.
- To deliver a range of custom formulated single-use tablet-based refill options for multiple technical scenarios that do not require the end-user to store unstable, wet chlorine in-between applications.
- To create a single dispensing system that is capable of dispensing different types of chlorine compounds or formulations with vastly differing dissolution rates (e.g. calcium hypochlorite vs sodium-dichloroisocyanurate).

The provision of the solids filter, and particularly one that has an oversize specification of >0.5 or smaller, has also surprisingly been found to be advantageous in achieving an even disinfectant concentration in the aqueous disinfectant solution over discharge time and in avoiding spikes in concentration.

The invention claimed is:

1. A device for dissolving a soluble disinfectant in solid form in a stream of water flowing in a flow path to provide an aqueous disinfectant solution in the flow path, the device comprising:

a conduit, defining a part of the flow path;

a hollow body located in the conduit and defining a part of the flow path;

a disinfectant dissolution zone in the flow path in the body, in which a soluble disinfectant in solid format is in use located; and a flow modification zone in the flow path in the body, at an effective distance upstream of the disinfectant dissolution zone, in which flow modification zone a flow modifying component is located and which flow modification zone has a diameter greater than the conduit upstream of the flow modification zone, wherein the flow modifying component is configured artificially to modify one or more flow characteristics of water of the stream of water, for modified impact of water of the stream of water onto the disinfectant, by physical interaction of water of the stream of water with the flow modifying component, at constant volumetric flow rate, in that the flow modifying component provides:

a flared, substantially conical radial flow directing formation having a maximum diameter provided by a downstream edge that approximates the diameter of the flow modifying zone, radially to direct water of the stream of water into a widened flow path relative to the width of the flow path immediately upstream of the flow modifying component and thus artificially to decrease a flow velocity of water so directed, thus preventing direct impingement of water, so directed, onto the disinfectant in the disinfectant dissolution zone.

2. The device according to claim 1, wherein the disinfectant is provided in the form of a single tablet that is arranged in the dissolution zone such that a surface thereof faces in an upstream direction, being the only surface of the tablet that is accessible to water of the stream of water.

3. The device according to claim 1, which includes a filter element downstream of the dissolution zone for filtering, downstream of the dissolution zone, solids from water of the stream of water, including oversize undissolved disinfectant.

4. The device according to claim 1, wherein the disinfectant is provided in the form of a plurality of grouped tablets located in a hollow, flexible packet that has symmetrically spaced apertures along its surfaces having a diameter of from 0.25 mm to 1.0 mm.

5. The device according to claim 1, wherein the disinfectant is selected from calcium hypochlorite, sodium dichloroisocyanurate (SDIC) and trichloroisocyanuric acid (TCCA).

6. The device according to claim 1, wherein the flow modifying component further provides a flow path narrowing formation, axially to direct and thereby artificially to increase the flow velocity of water of the stream of water passed through the formation.

* * * * *